(12) United States Patent
Banning

(10) Patent No.: US 7,544,796 B2
(45) Date of Patent: Jun. 9, 2009

(54) COLORANT COMPOUNDS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 267 days.

(21) Appl. No.: 11/641,576

(22) Filed: Dec. 19, 2006

(65) Prior Publication Data

US 2008/0146795 A1  Jun. 19, 2008

(51) Int. Cl.
 *C07D 487/22* (2006.01)
(52) U.S. Cl. .......... 540/128; 540/139; 540/140
(58) Field of Classification Search ......... 540/128
See application file for complete search history.

(56) References Cited

U.S. PATENT DOCUMENTS

| | | | |
|---|---|---|---|
| 3,653,932 A | 4/1972 | Berry et al. |
| 4,390,369 A | 6/1983 | Merritt et al. |
| 4,484,948 A | 11/1984 | Merritt et al. |
| 4,684,956 A | 8/1987 | Ball |
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,221,335 A | 6/1993 | Williams et al. |
| 5,372,852 A | 12/1994 | Titterington et al. |
| 5,496,879 A | 3/1996 | Griebel et al. |
| 5,621,022 A | 4/1997 | Jaeger et al. |
| 6,472,523 B1 | 10/2002 | Banning et al. |
| 6,476,219 B1 | 11/2002 | Duff et al. |
| 6,726,755 B2 | 4/2004 | Titterington et al. |

FOREIGN PATENT DOCUMENTS

| EP | 0 206 286 B1 | 5/1990 |
| EP | 0 187 352 B1 | 6/1991 |
| WO | WO 94/04619 | 3/1994 |

OTHER PUBLICATIONS

English abstract for DE4205636.
English abstract for DE4205713.
Copending U.S. Appl. No. 11/641,313, filed Dec. 19, 2006, entitled "Ink Compositions," by Jeffrey H. Banning.

*Primary Examiner*—James O Wilson
*Assistant Examiner*—Brian McDowell
(74) *Attorney, Agent, or Firm*—Oliff & Berridge, PLC

(57) ABSTRACT

Disclosed is a compound of the formula

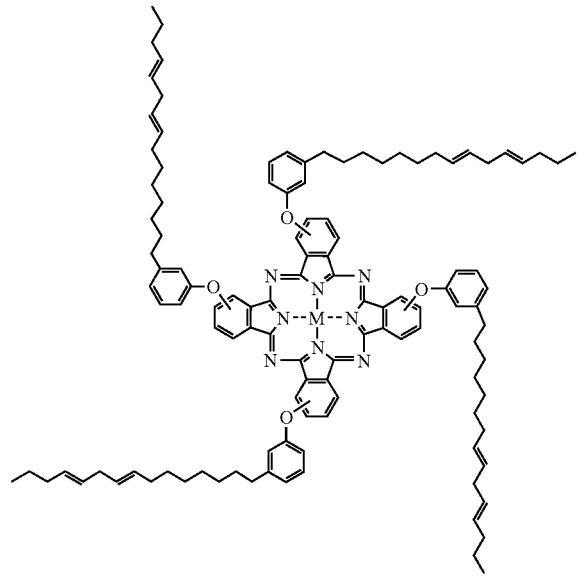

wherein M is an atom or group of atoms capable of bonding to the central cavity of a phthalocyanine molecule, wherein axial ligands optionally can be attached to M.

21 Claims, No Drawings

COLORANT COMPOUNDS

BACKGROUND

Disclosed herein are colorant compounds. More specifically, disclosed herein are phthalocyanine colorant compounds particularly suitable for use in radiation curable inks. One embodiment is directed to a compound of the formula

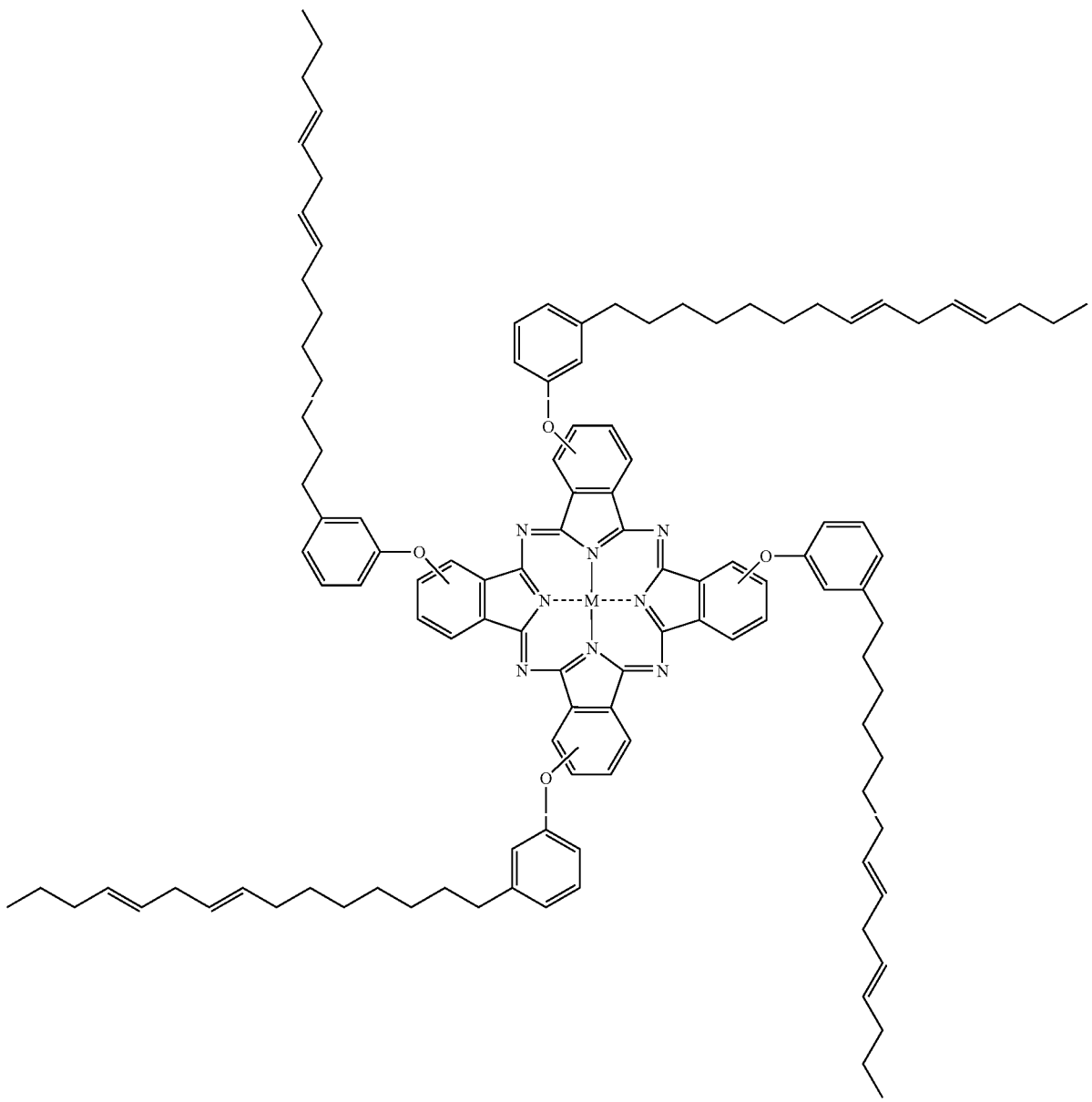

wherein M is an atom or group of atoms capable of bonding to the central cavity of a phthalocyanine molecule, wherein axial ligands optionally can be attached to M.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,472,523 (Banning et al.), U.S. Pat. No. 6,726,755 (Titterington et al.), and U.S. Pat. No. 6,476,219 (Duff et al.), the disclosures of each of which are incorporated herein by reference, disclose a compound of the formula

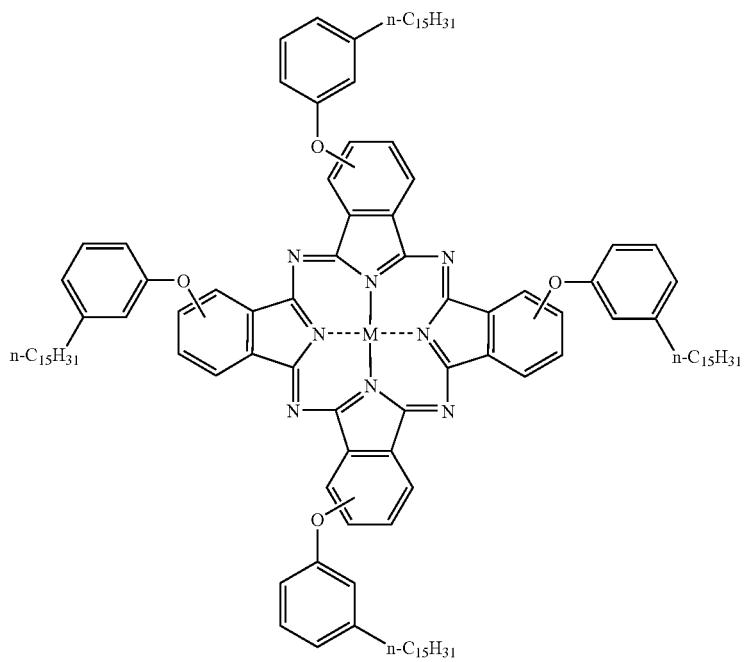

wherein M is an atom or group of atoms capable of bonding to the central cavity of a phthalocyanine molecule, wherein axial ligands optionally can be attached to M. U.S. Pat. No. 6,726,755 further discloses a phase change ink composition comprising a phase change ink carrier and this colorant compound. U.S. Pat. No. 6,476,219 further discloses methods for preparing these compounds.

While known compositions and processes are suitable for their intended purposes, a need remains for improved colorant compositions. In addition, a need remains for improved phthalocyanine compositions. Further, a need remains for colorants suitable for use in phase change inks. Additionally, a need remains for colorants that enable good to excellent lightfastness. There is also a need for improved colorants having improved cyan color for primary subtractive imaging. In addition, there is a need for improved colorants having high tinctorial power or spectral strength. Further, there is a need for improved cyan phase change ink colorants that are highly thermally stable in ink compositions for several weeks in air at temperatures exceeding 140° C. Additionally, there is a need for phase change ink colorants with low diffusion characteristic that will not bleed into inks containing other colorants. A need also remains for colorants with good to excellent lightfastness that are compatible with phase change ink vehicles. In addition, a need remains for colorants suitable for use in phase change inks that exhibit reduced or no variation in color over the life of the ink in the printer. Further, a need remains for colorants suitable for use in phase change inks that exhibit reduced or no variation in color subsequent to being deposited in imagewise fashion on substrates. Additionally, a need remains for colorants that have no carcinogenic or mutagenic effects. There is also a need for colorants that, when dissolved in phase change ink carriers, do not leave residues of material that might otherwise complicate filtration efficiency. In addition, there is a need for colorants that can react with other unsaturated moieties in ink carriers to enable radiation curable inks.

SUMMARY

Disclosed herein is a compound of the formula

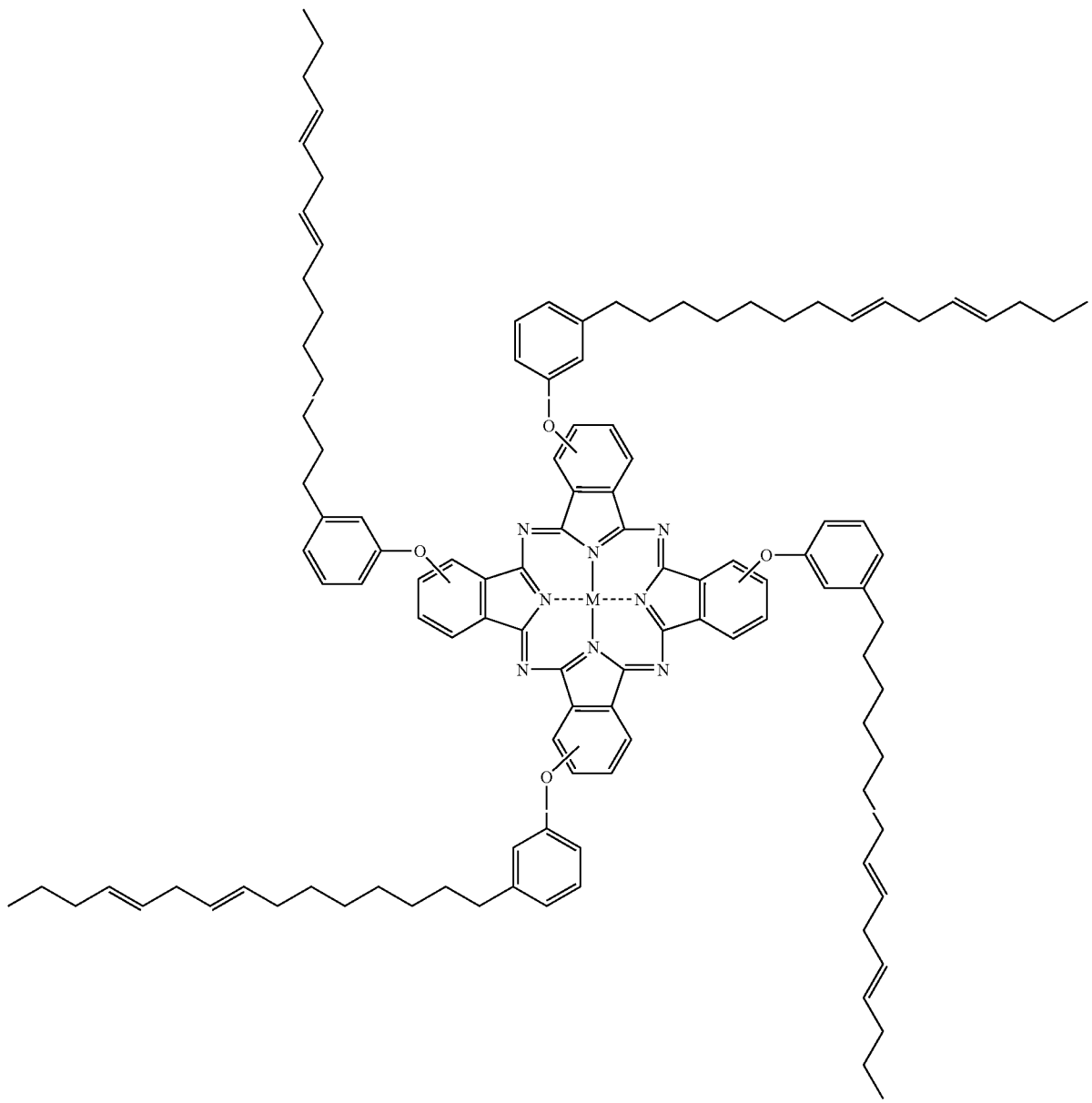

wherein M is an atom or group of atoms capable of bonding to the central cavity of a phthalocyanine molecule, wherein axial ligands optionally can be attached to M.

DETAILED DESCRIPTION

The colorant compounds disclosed herein are of the formula

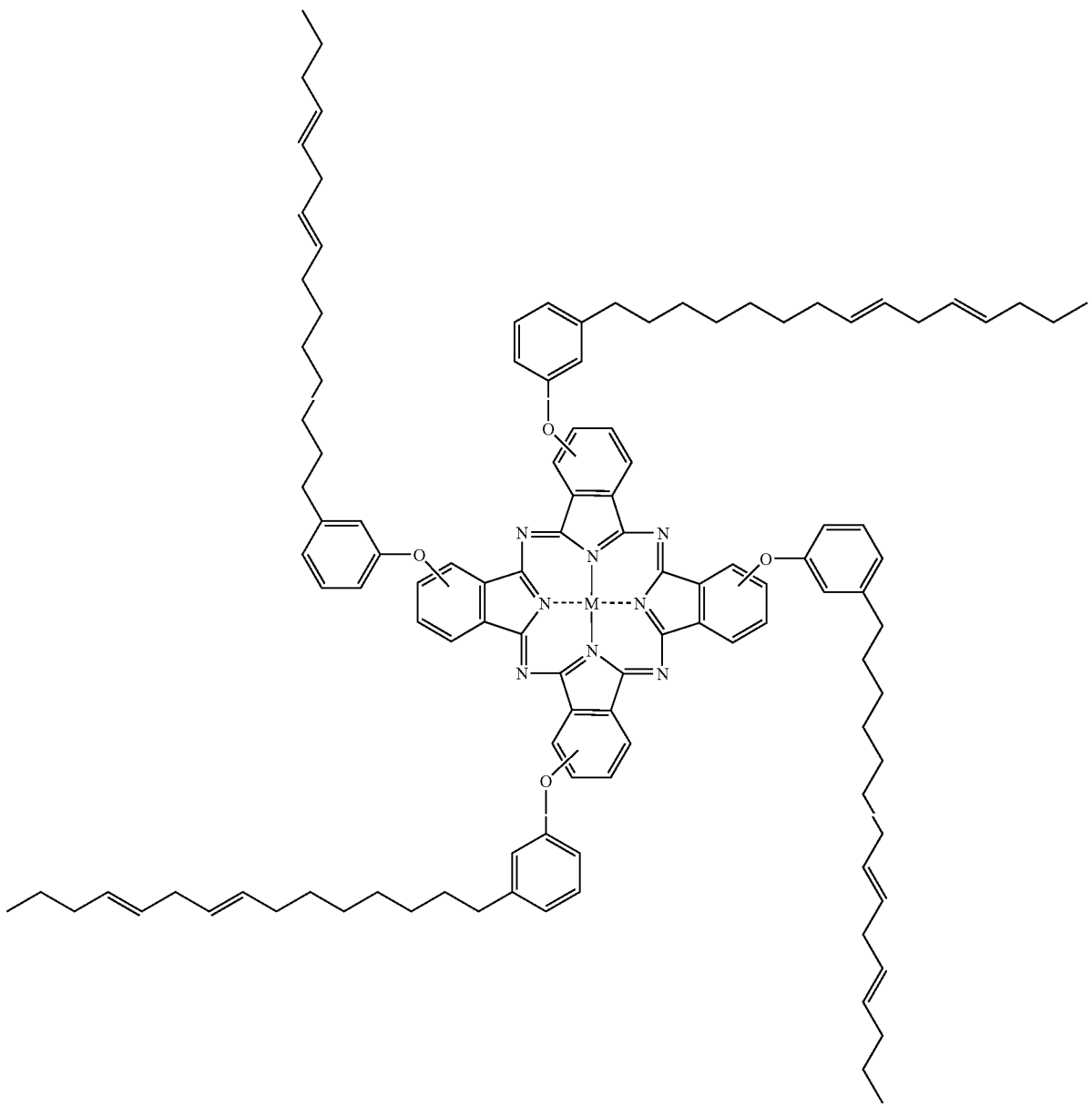

wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phtholocyanine Materials,* N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus (III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

It is believed that in most instances the colorant molecules are obtained as mixtures of four isomeric forms as illustrated below, wherein the $C_{4h}$, $D_{2h}$, $C_{2v}$, and $C_s$ isomers are present in the approximate ratio of, respectively, about 1:1:2:4:

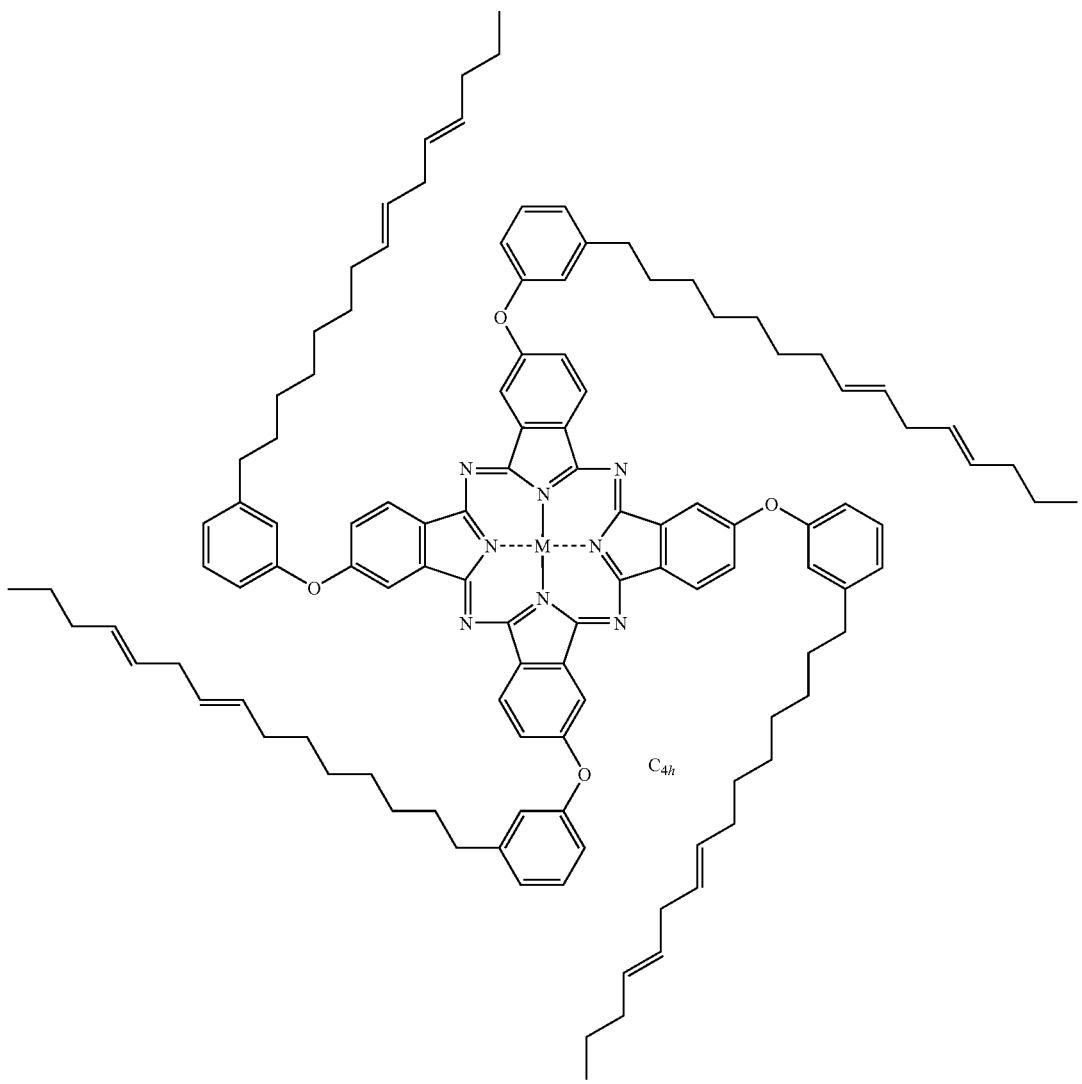

-continued
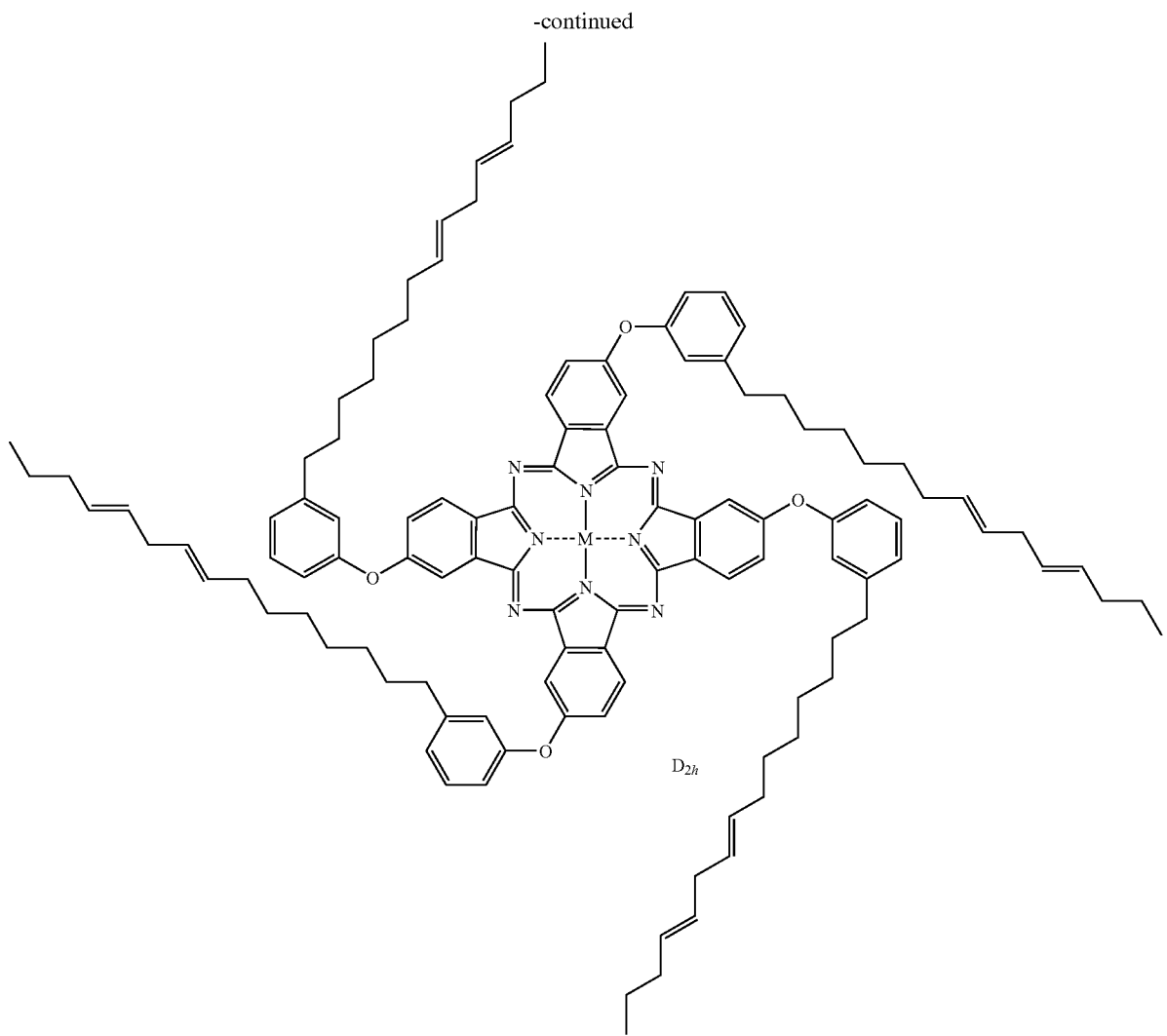
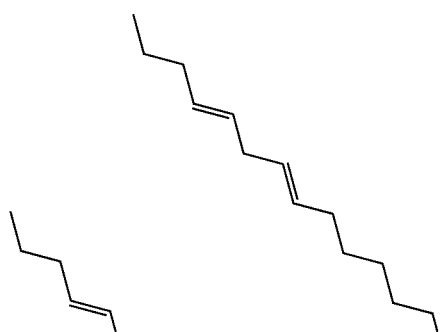

-continued
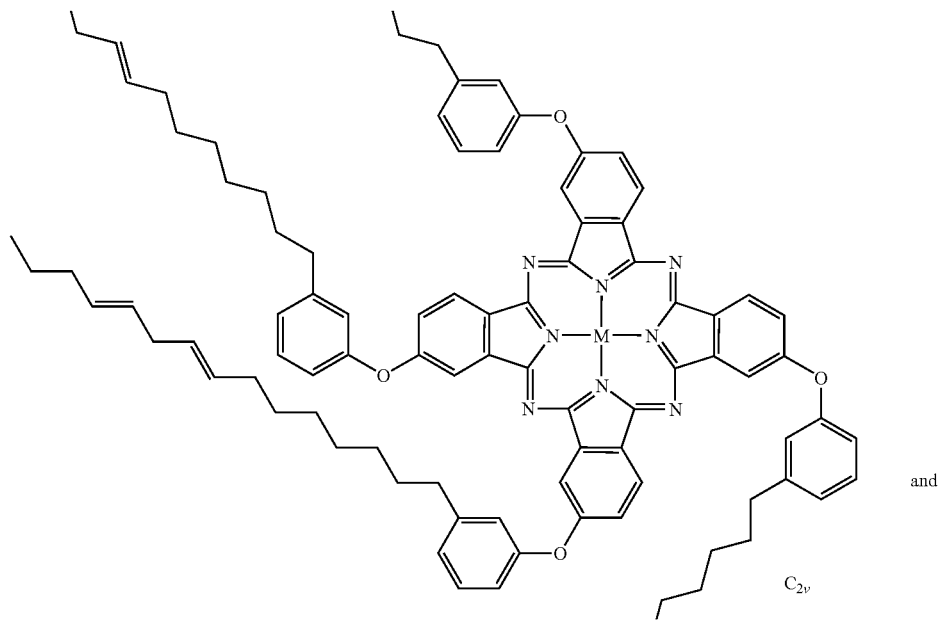
and
$C_{2v}$
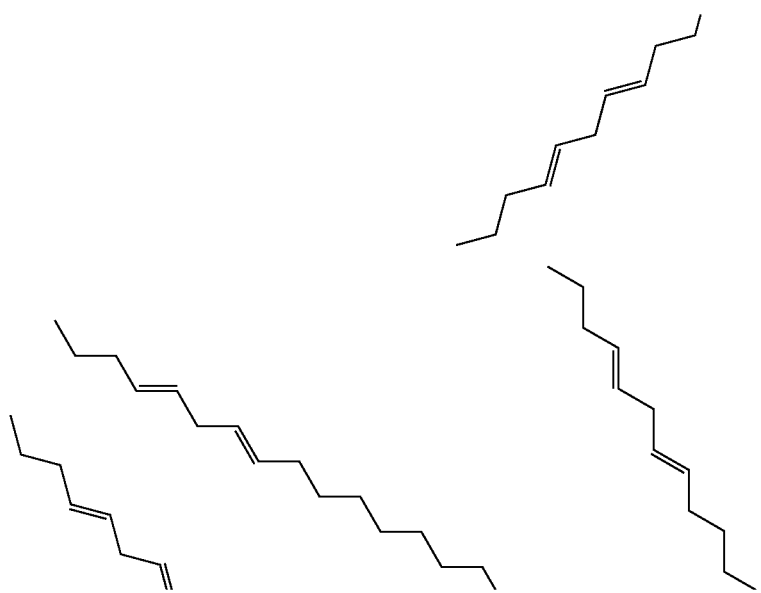

-continued
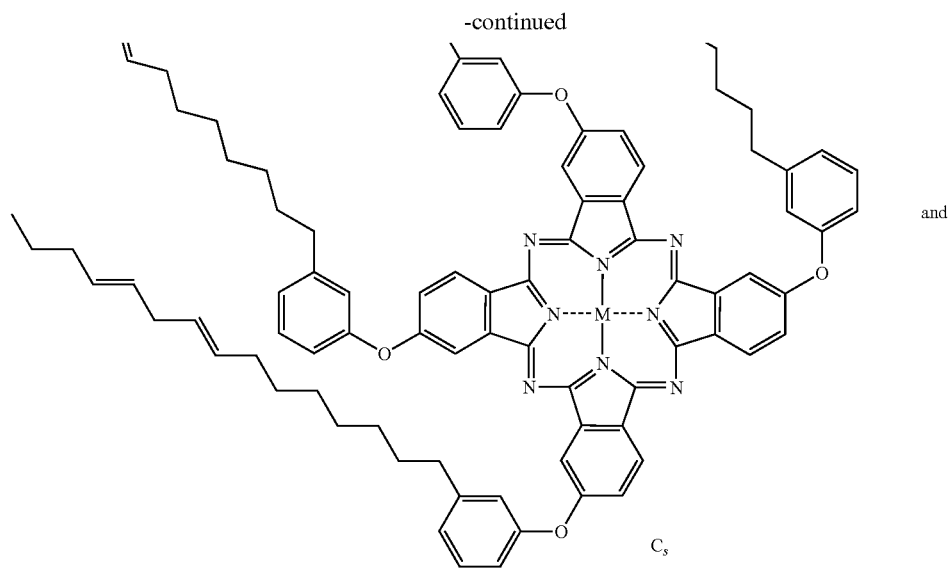
$C_s$
and
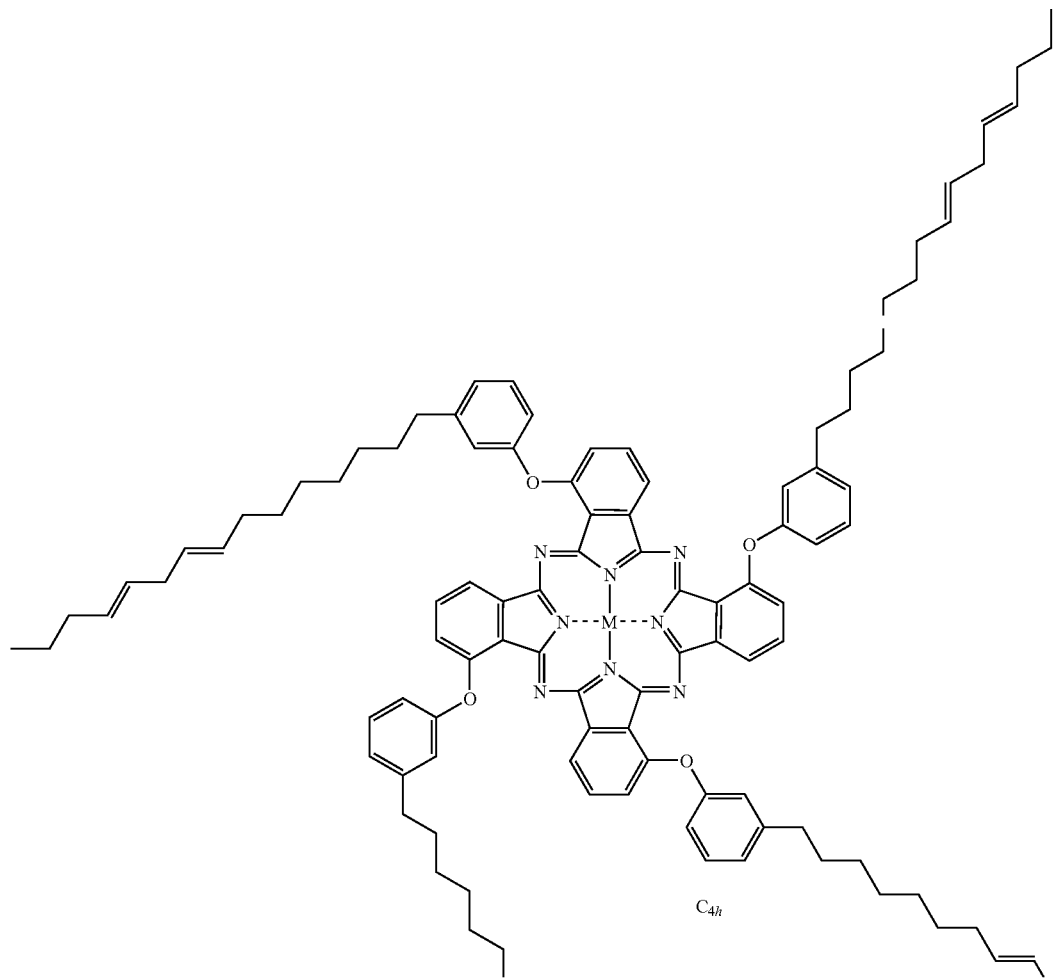
$C_{4h}$

-continued
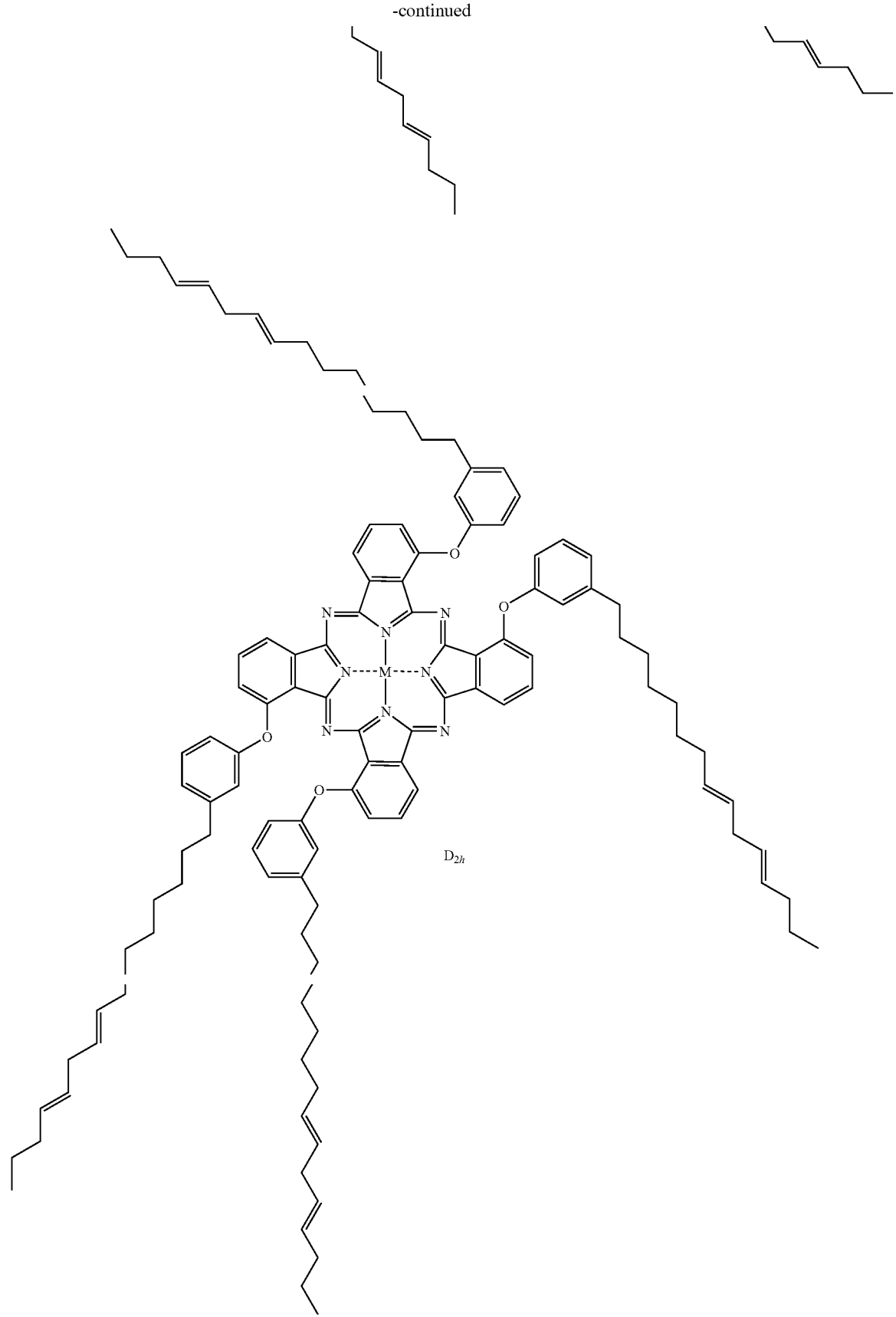
D$_{2h}$

-continued
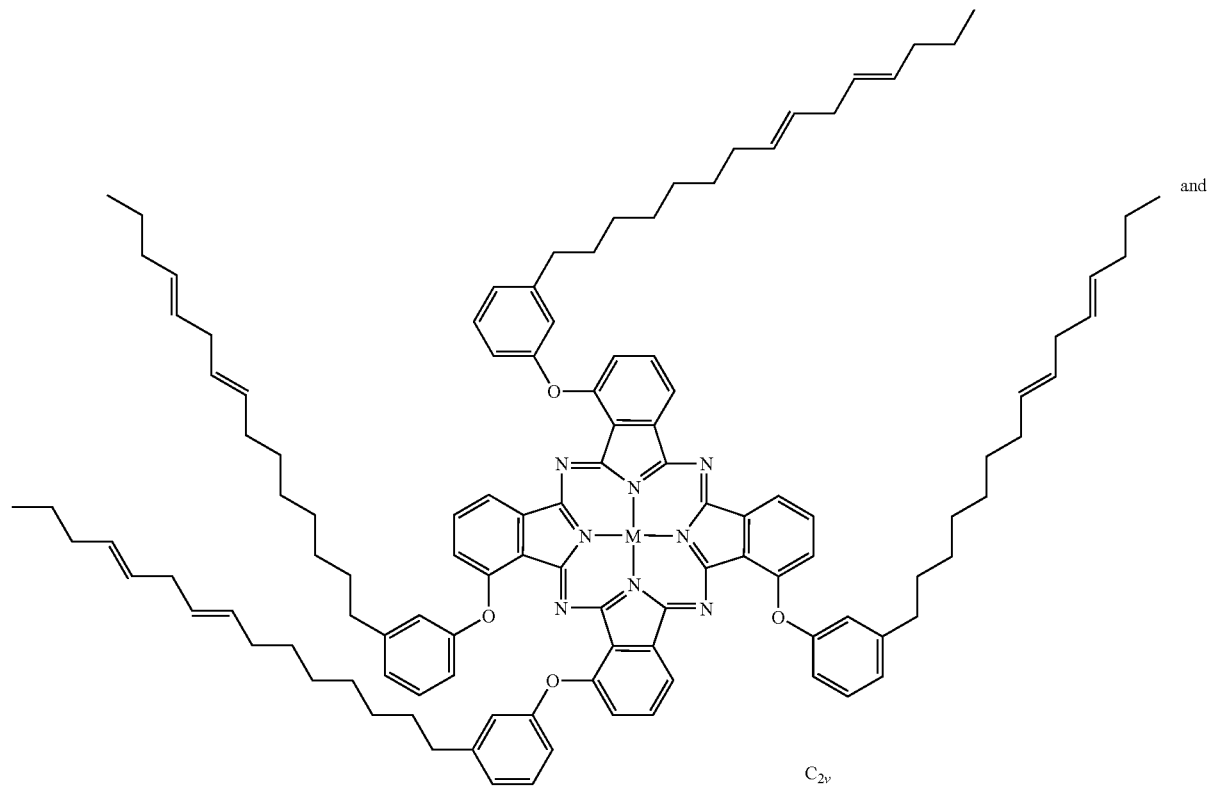
$C_{2v}$
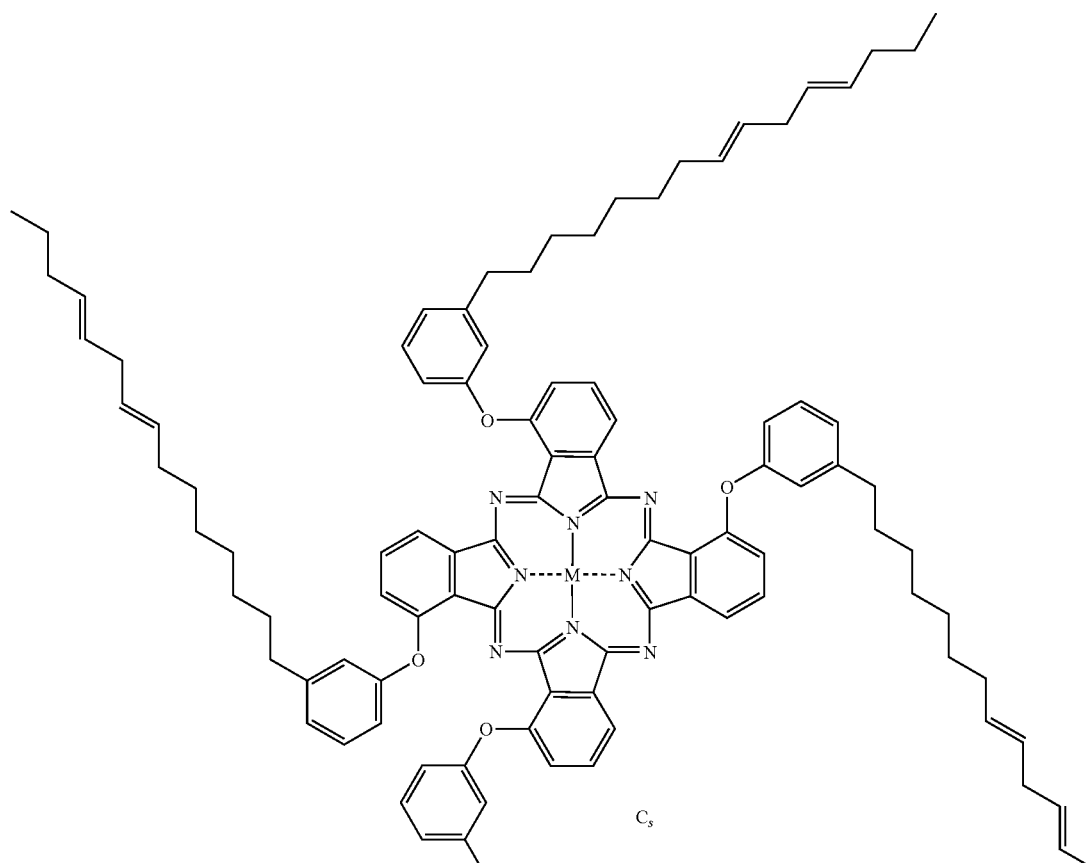
$C_s$
and

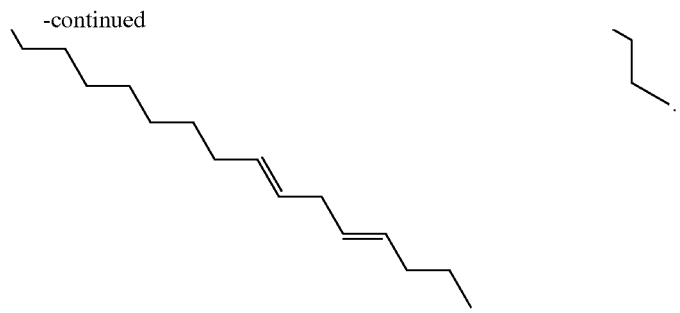
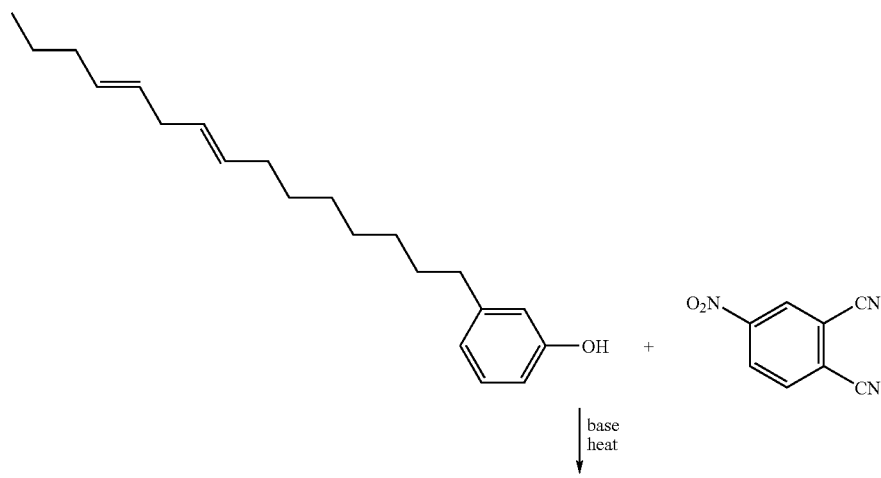
The colorant molecules disclosed herein can be prepared by any desired or effective process. In one embodiment, the process is carried out in two steps, the first of which is the synthesis of the alkylarylether adduct of phthalonitrile:
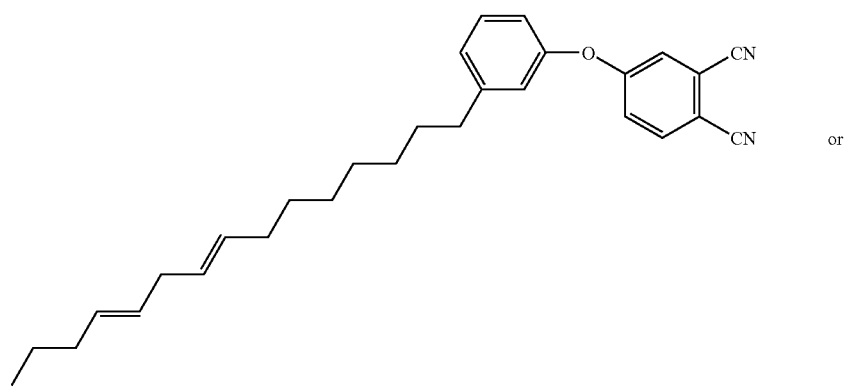
or

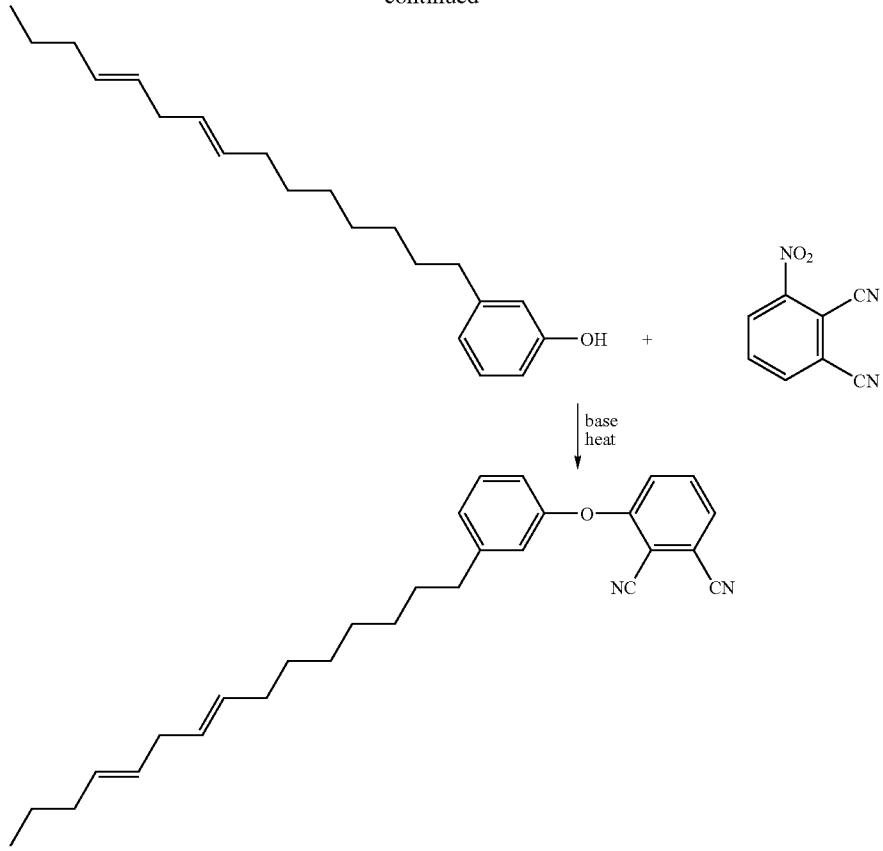

This process can be carried out by reacting the desired phenol with 3- or 4-nitrophthalonitrile in the presence of a base. Examples of suitable phenols include CARDOLITE® (MW=83.1; commercially available from Cardolite Corporation, Newark, N.J.) and the like.

Suitable bases include both organic and inorganic bases. Examples of organic bases include (but are not limited to) trialkyl amines (including triethylamine, tripropylamine, tributylamine, and the like), piperidine, 1,4-diazabicyclo[2.2.2]octane, and the like, as well as mixtures thereof. Examples of inorganic bases include (but are not limited to) lithium hydroxide, sodium hydroxide, potassium hydroxide, lithium carbonate, sodium carbonate, potassium carbonate, lithium hydride, sodium hydride, potassium hydride, lithium alkoxide, sodium alkoxide, potassium alkoxide (wherein the alkoxide can be, but is not limited to, methoxide, ethoxide, propoxide, butoxide (including t-butoxide), and the like), and the like, as well as mixtures thereof.

The reactants are dissolved in any solvent capable of dissolving the reactants, such as methanol, ethanol, propanol, butanol, dioxane, acetone, toluene, nitrobenzene, dimethyl formamide, dimethyl sulfoxide, 1-methyl-2-pyrrolidinone, 1-cyclohexyl-2-pyrrolidinone, sulfolane, and the like, as well as mixtures thereof. The solids content of the reaction mixture in one embodiment is at least about 0.5 parts by weight solvent per every 1 part by weight phenol, and in another embodiment is at least about 2 parts by weight solvent per every 1 part by weight phenol, and in one embodiment is no more than about 20 parts by weight solvent per every 1 part by weight phenol, and in another embodiment is no more than about 6 parts by weight solvent per every 1 part by weight phenol, although the solids content can be outside of these ranges.

In one embodiment, the phenol and the base are added to the solvent, followed by heating the reaction mixture, in one embodiment to a temperature of at least about 30° C., and in another embodiment to a temperature of at least about 80° C., and in one embodiment to a temperature of no more than about 150° C., and in another embodiment to a temperature of no more than about 120° C., although the temperature can be outside of these ranges, for a period of time in one embodiment of at least about 0.25 hour, and in another embodiment of at least about 0.5 hour, and in one embodiment of no more than about 8 hours, and in another embodiment of no more than about 2 hours, although the time can be outside of these ranges. By allowing the phenol and the base to react first, the phenoxide salt is formed; optionally, the 3- or 4-nitrophthalonitrile can be added with the phenol and the base in a single step, in which case the preheating step is eliminated.

Thereafter, the 3- or 4-nitrophthalonitrile is added to the reaction mixture and the reaction mixture is then heated, in one embodiment to a temperature of at least about 30° C., and in another embodiment to a temperature of at least about 70° C., and in one embodiment to a temperature of no more than about 150° C., and in another embodiment to a temperature of no more than about 110° C., although the temperature can be outside of these ranges, for a period of time in one embodiment of at least about 0.25 hour, and in another embodiment of at least about 0.5 hour, and in one embodiment of no more than about 24 hours, and in another embodiment of no more than about 4 hours, although the time can be outside of these ranges.

Thereafter, the reaction mixture is cooled, in one embodiment to a temperature of at least about 20° C., and in one embodiment to a temperature of no more than about 100° C., and in another embodiment to a temperature of no more than about 60° C., although the temperature can be outside of these ranges, followed by quenching in a precipitant solvent, such as water, methanol, mixtures thereof, and the like, by stirring the reaction solution into the precipitant solvent or vice-versa, in an amount in one embodiment of at least about 0.25 part by weight precipitant solvent per every 1 part by weight reaction solution, and in another embodiment of at least about 0.5 part by weight precipitant solvent per every 1 part by weight reaction solution, and in one embodiment of no more than about 2 parts by weight precipitant solvent per every 1 part by weight reaction solution, and in another embodiment of no more than about 10 parts by weight precipitant solvent per every 1 part by weight reaction solution, although the relative amounts can be outside of these ranges, thereby causing precipitation of the alkylaryloxyphthalonitrile intermediate product, which can be isolated by filtration. Thereafter, the intermediate can be reslurried with water or dilute acid (for example, 2 percent wt/volume hydrochloric acid) or base (for example, 2 percent sodium hydroxide) and filtered, and then reslurried and filtered with pure water, and the process repeated until inorganic and/or organic salts are removed from the product and the filtrate is of neutral pH and has a conductivity of less than about 20 microSiemens.

If desired, the product can be further purified by slurrying it in a solvent, such as methanol, ethanol, propanol, isopropanol, acetone, N,N'-dimethylformamide, mixtures thereof, mixtures of one or more of these solvents with water, and the like, followed by isolation of the product by filtration, which process may remove minor organic contaminants from the alkylaryloxyphthalonitrile intermediate. Thereafter, the solid product can, if desired, be dried by heating under vacuum at a temperature in one embodiment of at least about 20° C., and in another embodiment of at least about 25° C., and in one embodiment of no more than about 100° C., and in another embodiment of no more than about 50° C., although the temperature can be outside of these ranges, for a period in one embodiment of at least about 1 hour, and in one embodiment of no more than about 72 hours, although the time can be outside of these ranges. Optionally, if desired, the product can be recrystallized by heating in a solvent, such as methanol, ethanol, isopropanol, and the like, cooling to about 0° C., and filtering and drying the crystals.

For the synthesis of the alkylarylether adduct of phthalonitrile, the molar ratio of phenol to 3- or 4-nitrophthalonitrile in one embodiment is at least about 1:1, and in one embodiment is no more than about 3:1, and in another embodiment is no more than about 1.5:1, although the molar ratio can be outside of these ranges, and the molar ratio of phenol to base in one embodiment is at least about 1:1, and in one embodiment is no more than about 3:1, and in another embodiment is no more than about 1:1 to about 1.5:1, although the molar ratio can be outside of these ranges.

In this embodiment, the second step in the synthesis of the colorant molecules entails conversion of the alkylarylether phthalonitrile adduct to the phthalocyanine:

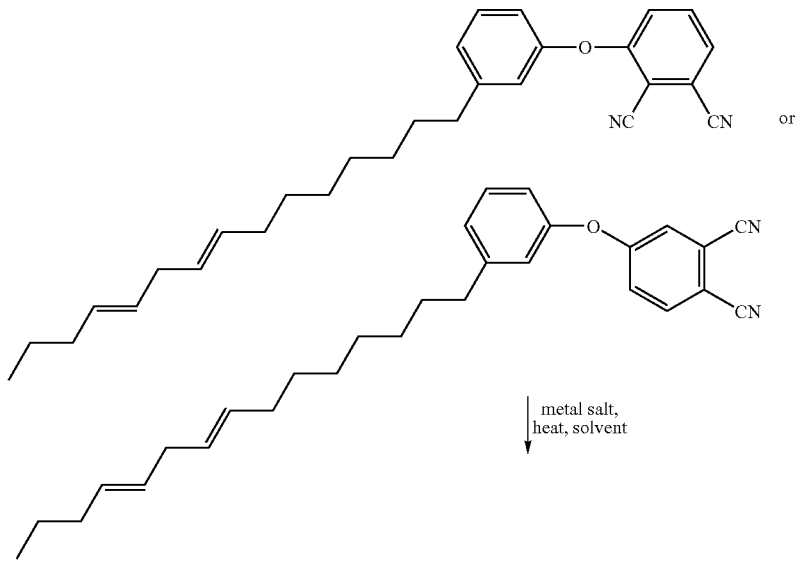

-continued

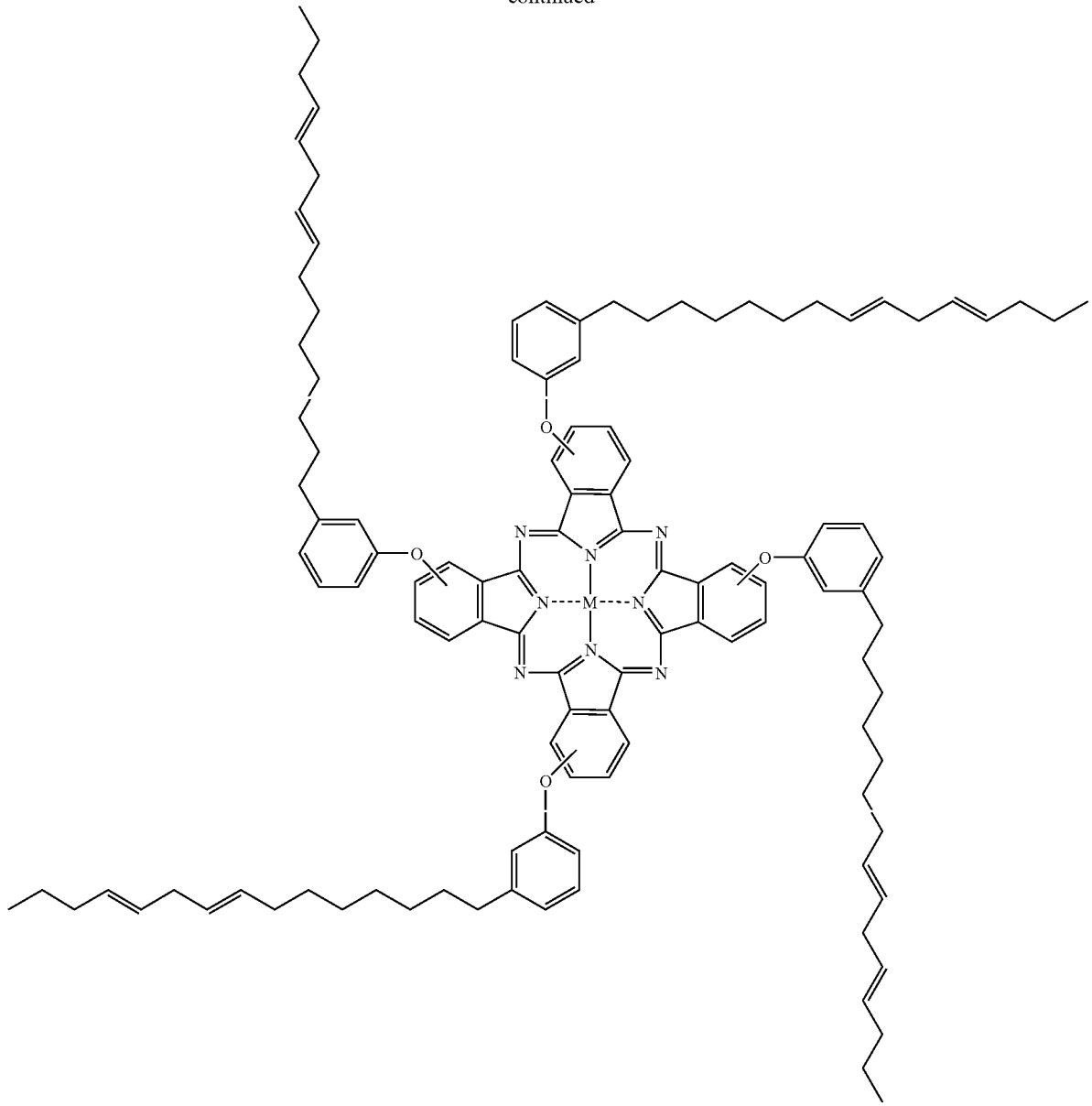

This process can be carried out by reacting the alkylarylether phthalonitrile adduct with a metal compound. Examples of suitable metal compounds include anhydrous and hydrated salts or complexes of the formula $$MX_n \cdot yH_2O$$

wherein M is a metal, such as lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benzoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof.

The alkylarylether phthalonitrile adduct, metal compound, and a solvent, such as ethylene glycol, amyl alcohol, hexanol, heptanol, tetralin, decalin, ISOPAR® (refined mineral spirits solvents available from Exxon), xylene, tributyl amine, N,N-dimethylaniline, quinoline, 1-chloronaphthalene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethylsulfoxide, N,N-dimethylformamide, N,N-dimethylacetamide, 1-methyl-2-pyrrolidinone, N-cyclohexyl-2-pyrrolidinone, sulfolane, and the like, as well as mixtures thereof, are combined to form the reaction mixture. The solids content of the reaction mixture in one embodiment is at least about 3 parts by weight alkylarylether phthalonitrile adduct per every 100 parts by weight solvent, and in another embodiment is at least about 10 parts by weight alkylarylether phthalonitrile adduct per every 100 parts by weight solvent, and in one embodiment is no more than about 60 parts by weight alkylarylether phthalonitrile adduct per every 100 parts by weight solvent, and in another embodiment is no more than about 30 parts by weight alkylarylether phthalonitrile adduct per every 100 parts by weight solvent, although the solids content can be outside of these ranges.

The reaction mixture is heated to reflux. Reflux temperature in one embodiment is at least about 80° C., and in another embodiment is at least about 140° C., and in one embodiment is no more than about 250° C., and in another embodiment is no more than about 190° C., although the temperature can be outside of these ranges.

The reaction mixture is refluxed for a period of time in one embodiment of at least about 1 hour, and in another embodiment of at least about 2 hours, and in one embodiment of no more than about 24 hours, and in another embodiment of no more than about 8 hours, although the time can be outside of these ranges.

Thereafter, the reaction is cooled to a temperature in one embodiment of at least about 25° C., and in another embodiment of at least about 50° C., and in one embodiment of no more than about 150° C., and in another embodiment of no more than about 100° C., although the temperature can be outside of these ranges, filtered, typically through a filter of paper, glass fiber, polypropylene, GORETEX®, and the like, although other methods of filtration can also be used, and washed with a solvent, such as water, acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, a catalyst or reaction promoter can also be included in the reaction mixture. Examples of suitable catalysts or reaction promoters include trialkanolamines, dialkyl monoalkanolamines, monoalkyl dialkanolamines, and the like, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof.

Suitable catalysts or reaction promoters also include ammonia-releasing compounds. Suitable ammonia-releasing compounds are any ammonium salts that release ammonia when heated, including (but not limited to) ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. When an ammonia releasing compound is employed as a catalyst or reaction promoter, while not required, in a specific embodiment, the reaction of the alkylarylether phthalonitrile adduct with the copper salt takes place with a two stage temperature-warming profile. The first stage entails heating the reaction mixture to an intermediate temperature, in one embodiment of at least about 80° C., and in one embodiment of no more than about 140° C., although the temperature can be outside of these ranges, and for a period of from time in one embodiment of at least about 0.25 hour, and in one embodiment of no more than about 3 hours, although the time can be outside of these ranges, during which time ammonia gas is slowly released. Thereafter, the reaction mixture is heated to a final temperature, in one embodiment of at least about 120° C., and in another embodiment of at least about 140° C., and in one embodiment of no more than about 250° C., and in another embodiment of no more than about 190° C., although the temperature can be outside of these ranges, and for a period of time in one embodiment of at least about 1 hour, and in another embodiment of at least about 2 hours, and in one embodiment of no more than about 24 hours, and in another embodiment of no more than about 10 hours, although the time can be outside of these ranges.

For the synthesis of the phthalocyanine compound, the molar ratio of phenoxy phthalonitrile adduct to metal compound in one embodiment is at least about 2:1, and in another embodiment is at least about 3:1, and in one embodiment is no more than about 10:1, and in another embodiment is no more than about 6:1, although the molar ratio can be outside of these ranges. When a catalyst or reaction promoter is used, the molar ratio of catalyst or reaction promoter to metal compound in one embodiment is at least about 0.1:1, and in another embodiment is at least about 0.5:1, and in one embodiment is no more than about 10:1, and in another embodiment is no more than about 2:1, although the molar ratio can be outside of these ranges.

In one specific embodiment, two or more catalysts or reaction promoters can be used, such as one or more from the class of alkanolamines and one or more from the class of ammonia-releasing compounds, two or more from the class of alkanolamines, two or more from the class of ammonia-releasing compounds, or the like.

Metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, although the number of carbon atoms can be outside of this range, and wherein the aryl portions thereof in one embodiment have from 6 to about 12 carbon atoms, although the number of carbon atoms can be outside of this range, carboxylic acids, such as alkylcarboxylic, arylcarboxylic, arylalkylcarboxylic, and alkylarylcarboxylic, wherein the alkyl portions thereof can be linear or branched, and wherein the carboxylic acid in one embodiment has from 1 to about 24 carbon atoms, although the number of carbon atoms can be outside of this range (such as formic, acetic, propionic, benzoic, and the like), and the like, as well as mixtures thereof. The acid is present in the water or alcohol solution in any desired or effective concentration, in one embodiment of at least about 1 percent by weight acid, and in another embodiment of at least about 2 percent by weight acid, and in one embodiment of no more than about 10 percent by weight acid, and in another embodiment of no more than about 5 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Alternatively, the metal-free phthalocyanine dye can be prepared by heating a concentrated solution of phenoxyphthalonitrile in a dialkyl monoalkanolamine solvent, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples including 2-dimethylaminoethanol, 2-diethylaminoethanol, 2-dimethylamino-1-propanol, and the like, as well as mixtures thereof, in the presence of an ammonia-releasing compound.

The ratio by weight of phenoxyphthalonitrile to dialkyl monoalkanolamine solvent in one embodiment is at least about 10:80, and in another embodiment is at least about 25:75, and in one embodiment is no more than about 60:40, and in another embodiment is no more than about 50:50, although the relative amounts can be outside of these ranges.

Suitable ammonia-releasing compounds include those listed hereinabove with respect to catalysts or reaction promoters. The molar ratio of ammonia-releasing compound to phenoxyphthalonitrile in one embodiment is at least about 0.1 molar equivalent ammonia-releasing compound per every 1 molar equivalent of phenoxyphthalonitrile, and in one embodiment is at least about 0.5 molar equivalent ammonia-releasing compound per every 1 molar equivalent of phenoxyphthalonitrile, and in one embodiment is no more than about 5 molar equivalents ammonia-releasing compound per every 1 molar equivalent of phenoxyphthalonitrile, and in another embodiment is no more than about 2 molar equivalents ammonia-releasing compound per every 1 molar equivalent of phenoxyphthalonitrile, although the relative amounts can be outside of these ranges.

The mixture can be initially heated to a first temperature, in one embodiment of at least about 50° C., and in another embodiment of at least about 65° C., and in one embodiment of no more than about 130° C., and in another embodiment of no more than about 125° C., although the temperature can be outside of these ranges, for a period of time in one embodiment of at least about 10 minutes, and in another embodiment of at least about 20 minutes, and in one embodiment of no more than about 120 minutes, and in another embodiment of no more than about 60 minutes, although the time can be outside of these ranges, to promote slow release of ammonia, then is subsequently heated to a second temperature which is higher than the first temperature, in one embodiment of at least about 120° C., and in another embodiment of at least about 135° C., and in one embodiment of no more than about 200° C., and in another embodiment of no more than about 170° C., although the temperature can be outside of these ranges, for a period of time in one embodiment of at least about 1 hour, and in another embodiment of at least about 2 hours, and in one embodiment of no more than about 24 hours, and in another embodiment of no more than about 10 hours, although the time can be outside of these ranges.

Thereafter, the reaction mixture is cooled, in one embodiment to a temperature of at least about 25° C., and in another embodiment to a temperature of at least about 50° C., and in one embodiment to a temperature of no more than about 125° C., and in another embodiment to a temperature of no more than about 100° C., although the temperature can be outside of these ranges, and the product is separated by filtration or by decantation and washed with a solvent, such as water, acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, the alkylarylether phthalonitrile adduct need not be isolated by addition of precipitant subsequent to its synthesis and prior to its reaction with the metal compound. In this embodiment, the reaction mixture in which the alkylarylether phthalonitrile adduct was formed can, if desired, optionally be filtered to remove any inorganic salts, followed by addition to the reaction mixture of the metal compound and, optionally, any desired reaction promoter. Thereafter, the reaction mixture is heated, to a temperature in one embodiment of at least about 120° C., and in another embodiment of at least about 140° C., and in one embodiment of no more than about 250° C., and in another embodiment of no more than about 190° C., although the temperature can be outside of these ranges, for a period of time in one embodiment of at least about 1 hour, and in another embodiment of at least about 2 hours, and in one embodiment for a period of time of no more than about 24 hours, and in another embodiment of no more than about 8 hours, although the time can be outside of these ranges. The phthalocyanine product thus formed can then be isolated as described hereinabove with respect to the two-step process.

Specific embodiments will now be described in detail. These examples are intended to be illustrative, and the claims are not limited to the materials, conditions, or process parameters set forth in these embodiments. All parts and percentages are by weight unless otherwise indicated,

EXAMPLE I 4-(3-Unsaturated C-15-Phenoxy)Phthalonitrile Intermediate

To a 500 milliliter 3-necked round bottom flask equipped with a magnetic stir bar, a nitrogen inlet, a silicone oil bath, and a condenser was charged 83.1 grams of CARDOLITE® (MW=83.1; obtained from Cardolite Corporation, Newark, N.J.), 33.5 grams of potassium carbonate (MW=138), and 330 grams of dry DMSO (in molecular sieves). The round bottom flask was placed in a 90° C. oil bath. After stirring for about half an hour, 41.9 grams of 4-nitrophthalonitrile (MW=173; obtained from TCI America, Portland, Oreg.) was added. The contents were heated/stirred for about 3 additional hours, followed by pouring into 300 grams of deionized water. A thick brown oil precipitated out. About 300 milliliters of hexanes were then added to the oil to extract the product and the contents were transferred to a separatory funnel. The lower (water/DMSO) layer was drained and the top (hexanes) layer was again washed with water. The water and the emulsion layer were drained. Since methanol and hexanes are not miscible, methanol was added to the hexanes layer to extract the starting material. However, no separation occurred. Hence, water was added to the separatory funnel to force separation. The water/methanol layer was then drained and the top hexanes layer was evaporated. A normal phase TLC was run employing toluene as the mobile phase, showing that no starting materials remained. The product was then

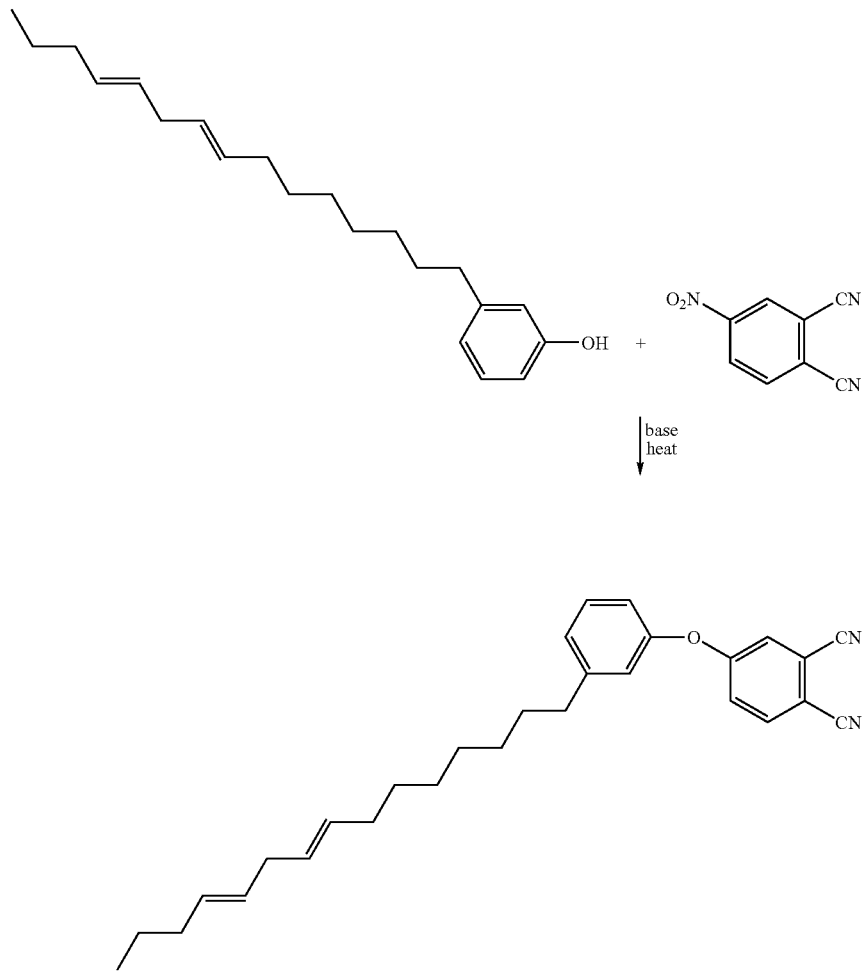

redissolved in hexanes and run through a silica plug. The hexanes were subsequently stripped off, yielding the desired product.

EXAMPLE II 4-(3-Unsaturated C-15-Phenoxy)Phthalonitrile Intermediate

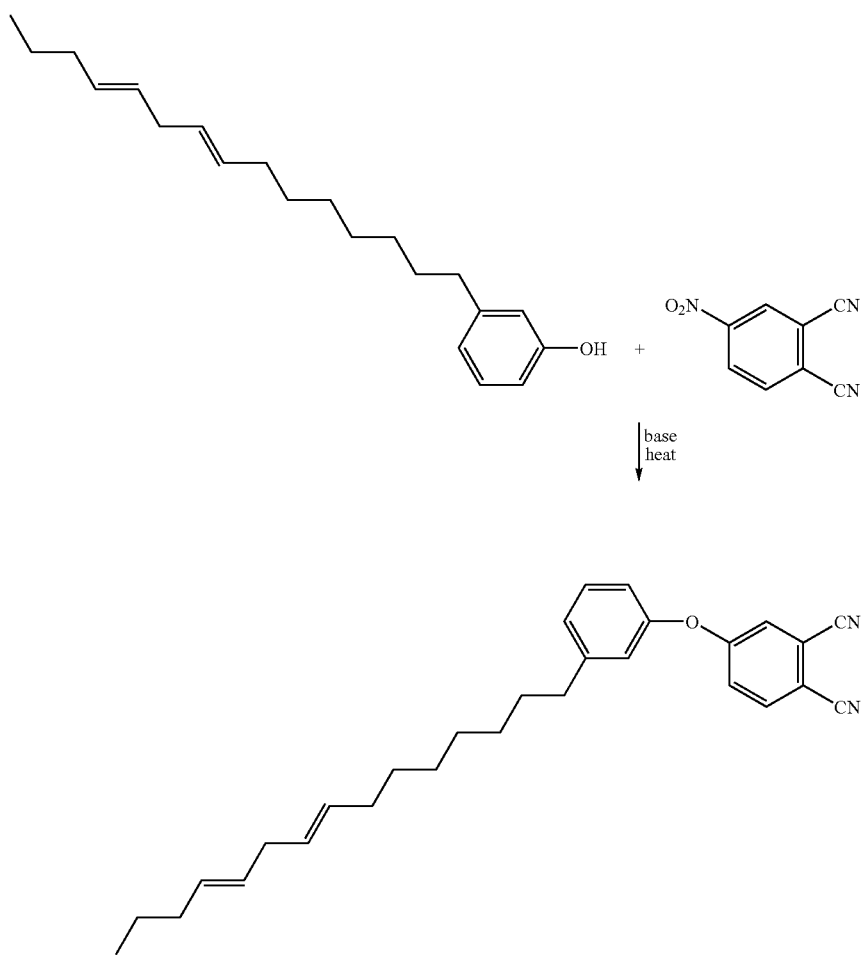

To a 500 milliliter 3-necked round bottom flask equipped with a magnetic stir bar, a nitrogen inlet, a silicone oil bath, and a condenser was charged 83.1 grams of CARDOLITE® (MW=83.1), 33.5 grams of potassium carbonate (MW=138), and 270 grams of dry DMSO. The round bottom flask was placed in a 90° C. oil bath. After stirring for about half an hour, 41.9 grams of 4-nitrophthalonitrile (MW=173) was added. The contents were heated/stirred for about 4 additional hours, followed by pouring into 600 grams of deionized water. A thick brown oil precipitated out. The contents were transferred to a separatory funnel. The low water/DMSO layer was drained and the top oil layer was dissolved in 300 milliliters of hexanes. The hexane layer was then washed with water twice and collected in a jar. Hexanes were evaporated and the remaining product was stored in a dark cabinet.

EXAMPLE III

3-(3-Unsaturated C-15-Phenoxy)Phthalonitrile Intermediate

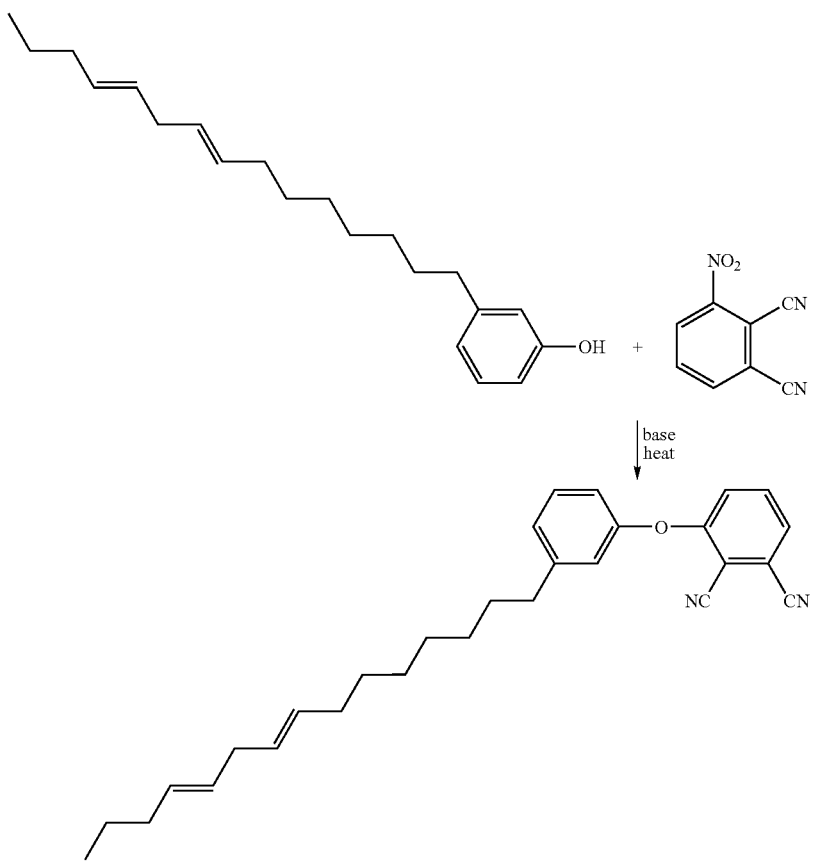

To a 500 milliliter 3-necked round bottom flask equipped with a magnetic stir bar, a nitrogen inlet, a silicone oil bath, and a condenser is charged 83.1 grams of CARDOLITE® (MW=83.1), 33.5 grams of potassium carbonate (MW=138), and 270 grams of dry DMSO. The round bottom flask is placed in a 90° C. oil bath. After stirring for about half an hour, 41.9 grams of 3-nitrophthalonitrile (MW=173) is added. The contents are heated/stirred for about 4 additional hours, followed by pouring into 600 grams of deionized water. It is believed that a product will precipitate out. The contents are transferred to a separatory funnel. The low water/DMSO layer is drained and the top oil layer is dissolved in 300 milliliters of hexanes. The hexane layer is then washed with water twice and collected in a jar. Hexanes are evaporated and the remaining product is stored in a dark cabinet.

EXAMPLE IV

(Unsaturated C-15-Phenoxy)-Substituted Copper Phthalocyanine

To a 100 milliliter one-necked round bottom flask equipped with a magnetic stir bar, a silicone oil bath, and a condenser was charged 10.0 grams of the intermediate prepared in Example I (MW=430), 1.2 grams of copper acetate (MW=181; obtained from Aldrich Chemical Co., Milwaukee, Wis.), 3.6 grams of ammonia acetate (MW=77; obtained from Aldrich Chemical Co.), and 40 milliliters of dry N-methyl pyrrolidinone (NMP). The round bottom flask was placed in a 120° C. oil bath with stirring. A blue color developed within 30 minutes. The temperature was then raised to 180° C. and 20 milliliters of additional dry NMP was added. After stirring at 180° C. for 1 hour, the contents were cooled. Very few solids precipitated out at this point, so the contents were poured into 250 milliliters of deionized water. A tacky blue solid precipitated out. The solids were collected by filtration, dried, put in a bottle, and placed in a dark cabinet.

EXAMPLE V

(Unsaturated C-15-Phenoxy)-Substituted Copper Phthalocyanine

To a 100 milliliter one-neck round bottom flask equipped with a magnetic stir bar, a silicone oil bath, and a condenser was charged 10.0 grams of the intermediate prepared in Example I (MW=430), 3.6 grams of ammonia acetate (MW=77), and 40 milliliters of dry NMP. The round bottom flask was placed in a 120° C. oil bath with stirring. A blue color developed within 30 minutes. The temperature was then raised to 180° C. and 20 milliliters of additional dry NMP was added. After stirring at 180° C. for 1 hour, the contents were cooled. Very few solids precipitated out at this point, so the contents were poured into 250 milliliters of deionized water.

A tacky blue solid precipitated out. The solids were collected by filtration, dried, put in a bottle and placed in a dark cabinet.

EXAMPLE VI

(Unsaturated C-15-Phenoxy)-Substituted Copper Phthalocyanine

To a 100 milliliter one-necked round bottom flask equipped with a magnetic stir bar, a silicone oil bath, and a condenser was charged 10.0 grams of the intermediate prepared in Example II (MW=430), 1.2 grams of copper acetate (MW=181), 3.6 grams of ammonia acetate (MW=77), and 40 milliliters of dry NMP. The round bottom flask was placed in a 120° C. oil bath with stirring. A blue color developed within 30 minutes. The temperature was then raised to 180° C. and 20 milliliters of additional dry NMP was added. After stirring at 180° C. for 1 hour the contents were cooled. Very few solids precipitated out at this point, so the contents were poured into 250 milliliters of deionized water. A tacky blue solid precipitated out. Toluene was added to the mixture to extract the product. The crude reaction mixture dissolved in toluene was poured in a separate funnel and washed with deionized water. The lower water/NMP layer was drained and the top toluene layer was run through a silica plug. After the toluene was removed, the spectral strength of the product was measured in toluene: e=28.29 L×A/g @ 681 nm. The solids were put in a bottle and placed in a dark cabinet.

EXAMPLE VII

(Unsaturated C-15-Phenoxy)-Substituted Copper Phthalocyanine

To a 100 milliliter one-necked round bottom flask equipped with a magnetic stir bar, a silicone oil bath, and a condenser is charged 10.0 grams of the intermediate prepared in Example III (MW=430), 1.2 grams of copper acetate (MW=181), 3.6 grams of ammonia acetate (MW=77), and 40 milliliters of dry NMP. The round bottom flask is placed in a 120° C. oil bath with stirring. It is believed that a blue color will develop within 30 minutes. The temperature is then raised to 180° C. and 20 milliliters of additional dry NMP is added. After stirring at 180° C. for 1 hour the contents are cooled. The contents are poured into 250 milliliters of deionized water. Toluene is added to the mixture to extract the product. The crude reaction mixture dissolved in toluene is poured in a separate funnel and washed with deionized water. The lower water/NMP layer is drained and the top toluene layer is run through a silica plug. The solids are put in a bottle and placed in a dark cabinet.

EXAMPLE VIII

(Unsaturated C-15-Phenoxy)-Substituted Manganese Phthalocyanine

To a 100 milliliter one-neck round bottom flask equipped with a magnetic stir bar, a silicone oil bath, and a condenser is charged 4.73 grams of the intermediate prepared in Example II (MW=426), 0.34 grams of manganese II chloride (available from Aldrich Chemical Co.), 3.6 grams of DMAE (dimethylaminoethanol, available from Aldrich Chemical Co.), and 20 milliliters of dry NMP. The round bottom flask is placed in a 180° C. oil bath with stirring. It is believed that a bluish-green color will develop within 60 minutes. The reaction mixture is then stirred at 180° C. After about 1 hour at 180° C., 50 milliliters of dimethyl formamide (DMF) is added and the reaction mixture is then cooled to room temperature. About 100 milliliters of hexanes is then added to the crude reaction product and the resulting mixture is transferred to a separatory funnel. The lower DMF/NMP layer is drained and the top hexanes layer is collected. The hexanes are distilled off and the remaining product is collected, placed in a bottle, and stored in a dark cabinet.

EXAMPLE IX

(Unsaturated C-15-Phenoxy)-Substituted Iron Phthalocyanine

The process of Example VIII is repeated except that 0.38 grams of iron II chloride (available from Aldrich Chemical Co.) are substituted for the 0.34 grams of manganese II chloride.

INK EXAMPLE 1

An ink base was prepared by melting, admixing, and filtering the following ingredients: (a) polyethylene wax (PE 655, obtained from Baker Petrolite, Tulsa, Okla., of the formula $CH_3(CH_2)_{50}CH_3$), 43.59 parts by weight; (b) stearyl stearamide wax (KEMAMIDE® S-180, obtained from Crompton Corporation, Greenwich, Conn.), 19.08 parts by weight; (c) tetra-amide resin obtained from the reaction of one equivalent of a C-36 dimer acid (obtained from Uniqema, New Castle, Del.) with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 18.94 parts by weight; (d) urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 11.71 parts by weight; (e) urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 6.48 parts by weight; and (f) NAUGUARD® 445 antioxidant (obtained from Uniroyal Chemical Co., Middlebury, Conn.), 0.20 parts by weight.

600 grams of the ink carrier components listed above in the percentages listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER AID, obtained from Fluka Chemika, Switzerland, and proceeded at a temperature of 135° C. until complete after 6 hours. The ink base was poured into molds containing about 31 grams of the colorless ink base and allowed to cool.

INK EXAMPLE 2

About 30.0 grams of the colorless ink base from Ink Example 1 was placed in a 100 milliliter beaker with a magnetic stir bar and subsequently placed in a 135° C. oil bath until molten. Thereafter, 1.2 grams of the colorant from Example V was added and stirred for about 3 hours. The cyan colored ink was then poured into an aluminum mold.

INK EXAMPLE 3

Using a RK Print-Coat Instruments Ltd. K-proofer, print samples of the ink from Ink Example 2 were produced on HAMMERMILL LASERPRINT® paper. These proofs show three different intensities of ink coverage on the paper.

INK EXAMPLE 4

Ink Examples 1 through 3 are repeated with the unsaturated C 15-phenoxy)-substituted copper phthalocyanine prepared as described in Example VII. It is believed that similar results will be obtained.

INK EXAMPLE 5

Ink Examples 1 through 3 are repeated with the unsaturated C 15-phenoxy)-substituted manganese phthalocyanine prepared as described in Example VIII. It is believed that similar results will be obtained.

INK EXAMPLE 6

Ink Examples 1 through 3 are repeated with the unsaturated C 15-phenoxy)-substituted iron phthalocyanine prepared as described in Example IX. It is believed that similar results will be obtained.

INK EXAMPLE 7

To a 2 liter three neck flask equipped with a stopper, dropping funnel, stir bar, and reflux condenser is added trimethyl-1,6-diisocyanatohexane (mixture of 2,2,4- and 2,4,4-isomers, 118.7 grams, 0.57 mol, available from Sigma-Aldrich, Milwaukee, Wis.), dibutyltin dilaurate (3.56 grams, 5.6 mmol, available from Sigma-Aldrich) and anhydrous tetrahydrofuran (1 liter). 1,4-Butanediol vinyl ether (133.2 grams, 1.2 mol, available from Sigma-Aldrich) is added slowly dropwise to the stirring solution via the addition funnel. The reaction mixture is brought to reflux and is kept at this temperature until deemed complete by infrared spectroscopy (about 5 hours, confirmed by the disappearance of the isocyanate peak at 2200 cm$^{-1}$). When the reaction is complete, methanol (500 milliliters) is added to quench any residual isocyanate and the solution is stirred for 0.5 hour. The solvent is stripped in vocuo and the residual oil is triturated with hexane (3×500 milliliters), dissolved in methylene chloride (1 liter), washed with water (1×750 milliliters), dried over anhydrous magnesium sulfate, filtered, and concentrated in vocuo to afford a pale yellow oil. The product is believed to be bis[4-(vinyloxy)butyl]trimethyl-1,6-hexanedylbiscarbamate (mixture of 2,2,4- and 2,4,4-isomers, a mixture of compounds of the formulae

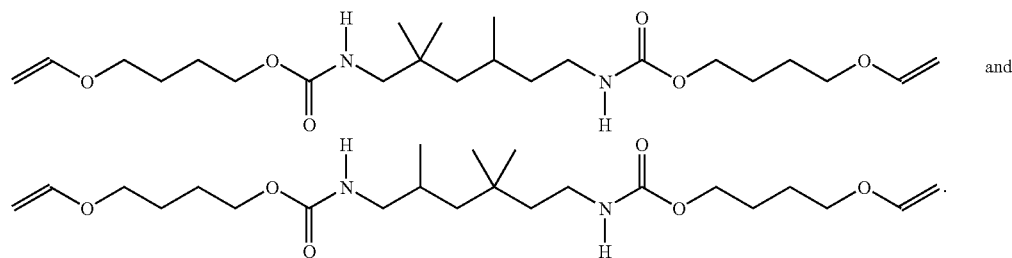

and

To a 1 liter, two neck flask equipped with a stir bar, argon inlet, and stopper is added dodecanedioic acid (10.0 grams, 43 mmol, available from Sigma-Aldrich), 1,4-butanediol vinyl ether (10.1 grams, 87 mmol, available from Sigma-Aldrich), 4-(dimethylamino)pyridine (1.07 gram, 8.8 mmol, available from Sigma-Aldrich), 1-hydroxybenzotriazole (1.18 gram, 8.7 mmol, available from Sigma-Aldrich) and methylene chloride (500 milliliters). The reaction mixture is cooled to 0° C. and 1-[3-(dimethylamino)propyl]-3-ethylcarbodiimide hydrochloride (16.6 grams, 87 mmol, available from Sigma-Aldrich) is added portionwise. The reaction mixture is stirred at 0° C. for 0.5 hour, followed by stirring at room temperature until the reaction is deemed complete by $^1$H NMR spectroscopy in DMSO-$d_6$ (about 2 hours); the signal corresponding to the methylene protons alpha to the carbonyl groups of 1,12-dodecanedioc acid (4H, triplet at δ2.18) is consumed and is replaced by a triplet at δ2.27 (4H), corresponding to [H$_2$C=CHO(CH$_2$)$_4$OOCC$\underline{H}_2$(CH$_2$)$_4$]$_2$. The reaction mixture is then concentrated in vacuo and the residue is dissolved in ethyl acetate (300 milliliters). The organic layer is washed with saturated sodium bicarbonate (2×150 milliliters) and water (2×150 milliliters), dried over anhydrous sodium sulfate, filtered, and concentrated in vacuo. The crude product is recrystallized from methanol to afford a white solid. The product is believed to be bis[4-(vinyloxy)butyl]dodecanedioate, of the formula

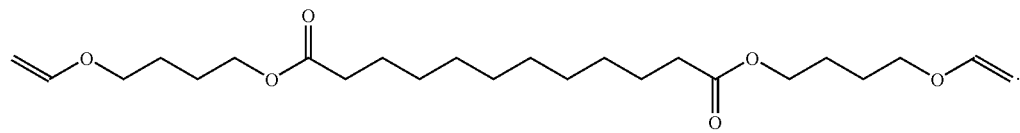

To an aluminum pan is added 59.35 grams of bis[4-(vinyloxy)butyl]trimethyl-1,6-hexanediylbiscarbamate (mixture of 2,2,4- and 2,4,4-isomers), 12.49 grams of bis[4-(vinyloxy)butyl]dodecanedioate, 8.29 grams of R-GEN® BF-1172 (cationic photoinitiator; substituted triarylsulfonium hexafluorophosphate salt in propylene carbonate as a 40% solution; available from Chitec Chemical Co., Ltd., Taiwan, R.O.C.), 11.45 grams of VEctomer® 5015 (available from Sigma-Aldrich) and 12.50 grams of 1-octadecanol (available from Sigma-Aldrich). The mixture is heated with stirring at 100° C. until visually homogenous (about 1 hour). At this point, 0.94 grams of the (unsaturated C-15-phenoxy)-substituted copper phthalocyanine dye prepared in Example IV is added and the mixture is stirred with heating for an additional 1 hour.

The ink is incorporated into a PHASER® 860 printer modified to change the intermediate transfer drum temperature, paper preheating temperature, and ink heating temperature and printed via transfuse onto LUSTROGLOSS® (Sappi Warren Papers) glossy coated paper and HAMMERMILL® (International Paper) and XEROX® 4024 uncoated papers. It is believed that all of the prints will show evidence of UV-induced polymerization (i.e., an increase in robustness as determined by rub and scratch) when exposed to light from a UV Fusion LC-6B Benchtop Conveyor equipped with UV Fusion F300S Ultraviolet Lamp System employing an "H" bulb for about 3 seconds.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:
1. A compound of the formula

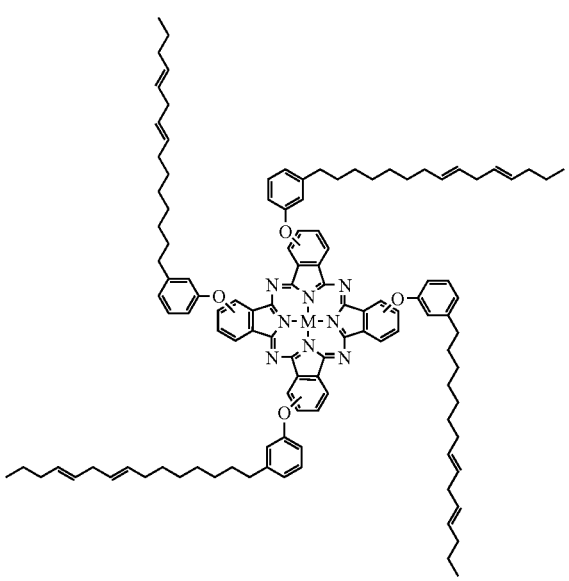

wherein M is an atom or group of atoms capable of bonding to the central cavity of a phthalocyanine molecule, wherein axial ligands optionally can be attached to M.

2. A compound according to claim 1 wherein M is dihydrogen.

3. A compound according to claim 1 wherein M is dilithium, disodium, dipotassium, beryllium, magnesium, calcium, strontium, barium, chromium, iron, cobalt, nickel, zinc, tin, lead or cadmium.

4. A compound according to claim 1 wherein M is manganese or iron.

5. A compound according to claim 1 wherein M is copper.

6. A compound according to claim 1 wherein M is a divalent halo-metal or halo-metalloid group.

7. A compound according to claim 6 wherein the metal is iron, titanium, chromium, aluminum, gallium, indium, phosphorus, or tin.

8. A compound according to claim 6 wherein the halide is fluoride, chloride, bromide or iodide.

9. A compound according to claim 1 wherein M is a divalent oxometal group.

10. A compound according to claim 9 wherein the metal is molybdenum, vanadium or titanium.

11. A compound according to claim 1 wherein M is a hydroxymetal group.

12. A compound according to claim 11 wherein the metal is aluminum, gallium, silicon, germanium or tin.

13. A compound according to claim 1 wherein M is a divalent metal-oxyhydrocarbon or metalloidal-oxyhydrocarbon group.

14. A compound according to claim 13 wherein the metal is aluminum, gallium, silicon or germanium.

15. A compound according to claim 13 wherein the oxyhydrocarbon is an oxyalkyl group, an oxyaryl group, an oxyalkylaryl group, an oxyarylalkyl group an oxyheterocyclic group.

16. A compound according to claim 1 wherein the compound is derived from 4-nitrophthalonitrile.

17. A compound according to claim 1 wherein the compound is of the formula

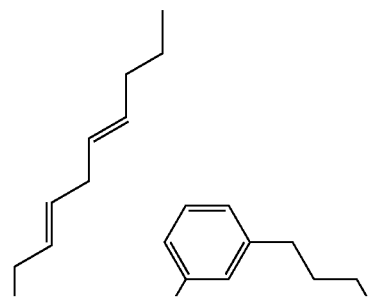
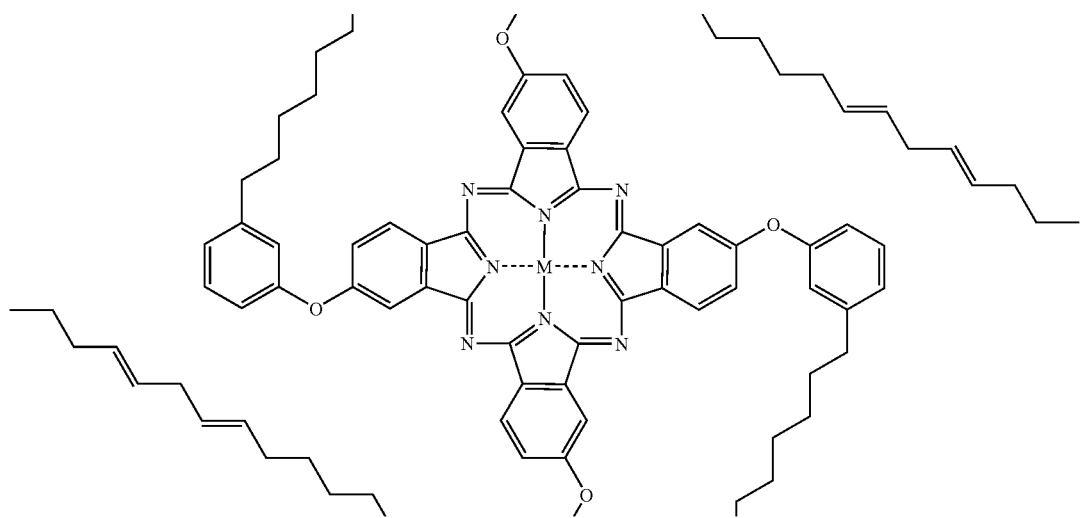
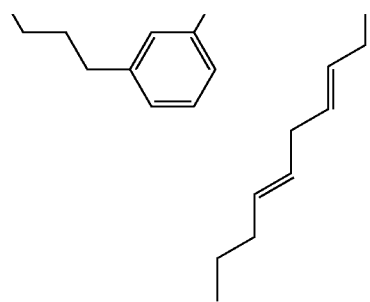

-continued
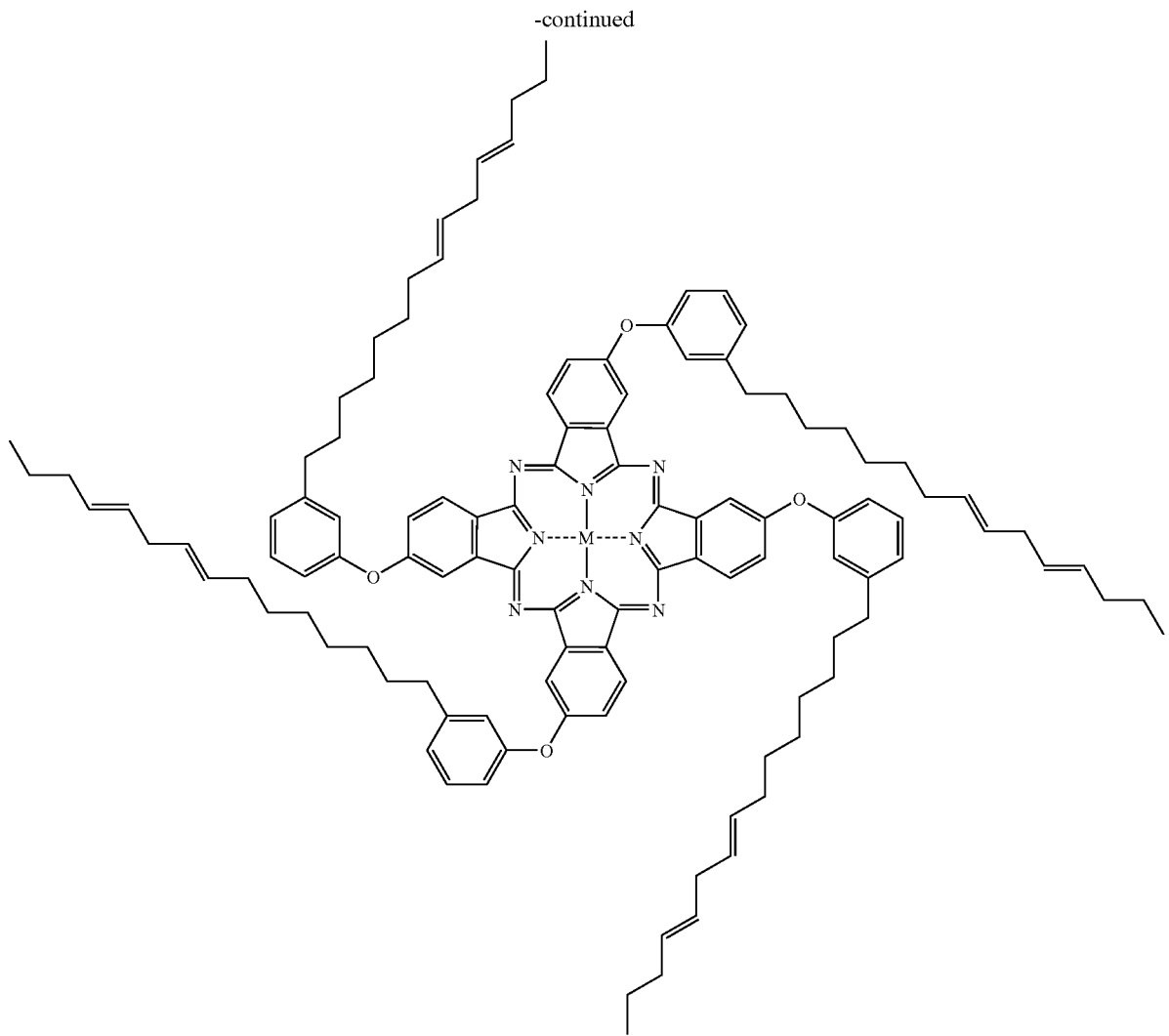
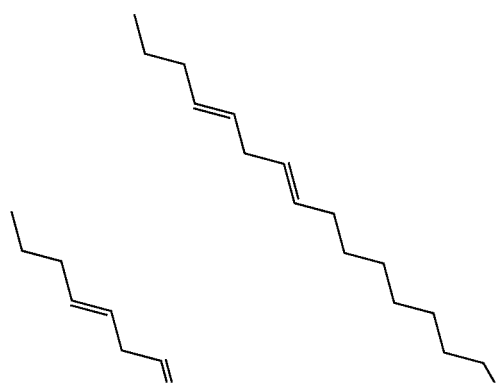

-continued
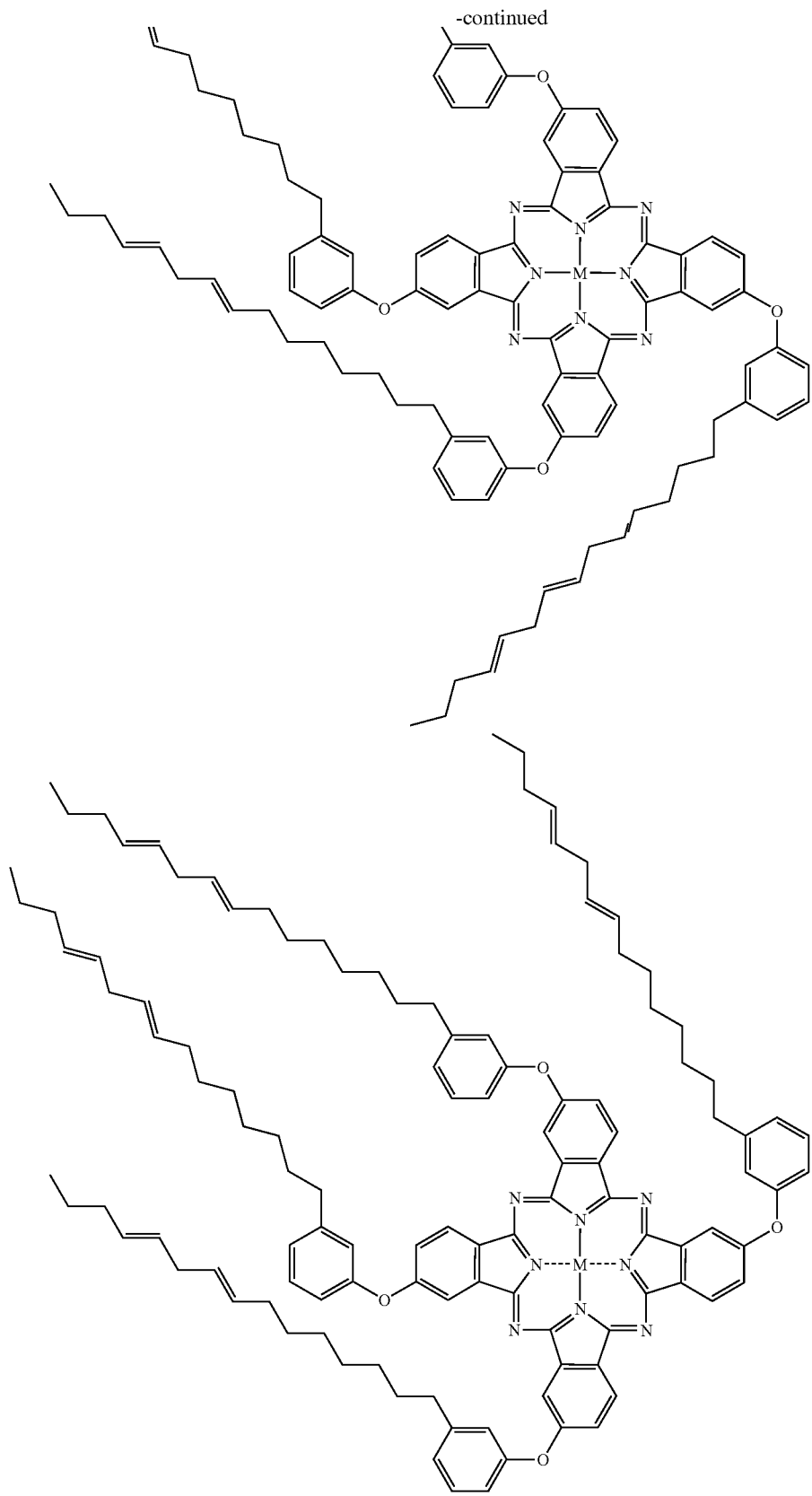
or mixtures thereof.

18. A compound according to claim 1 wherein the compound is derived from 3-nitrophthalonitrile.
19. A compound according to claim 1 wherein the compound is of the formula
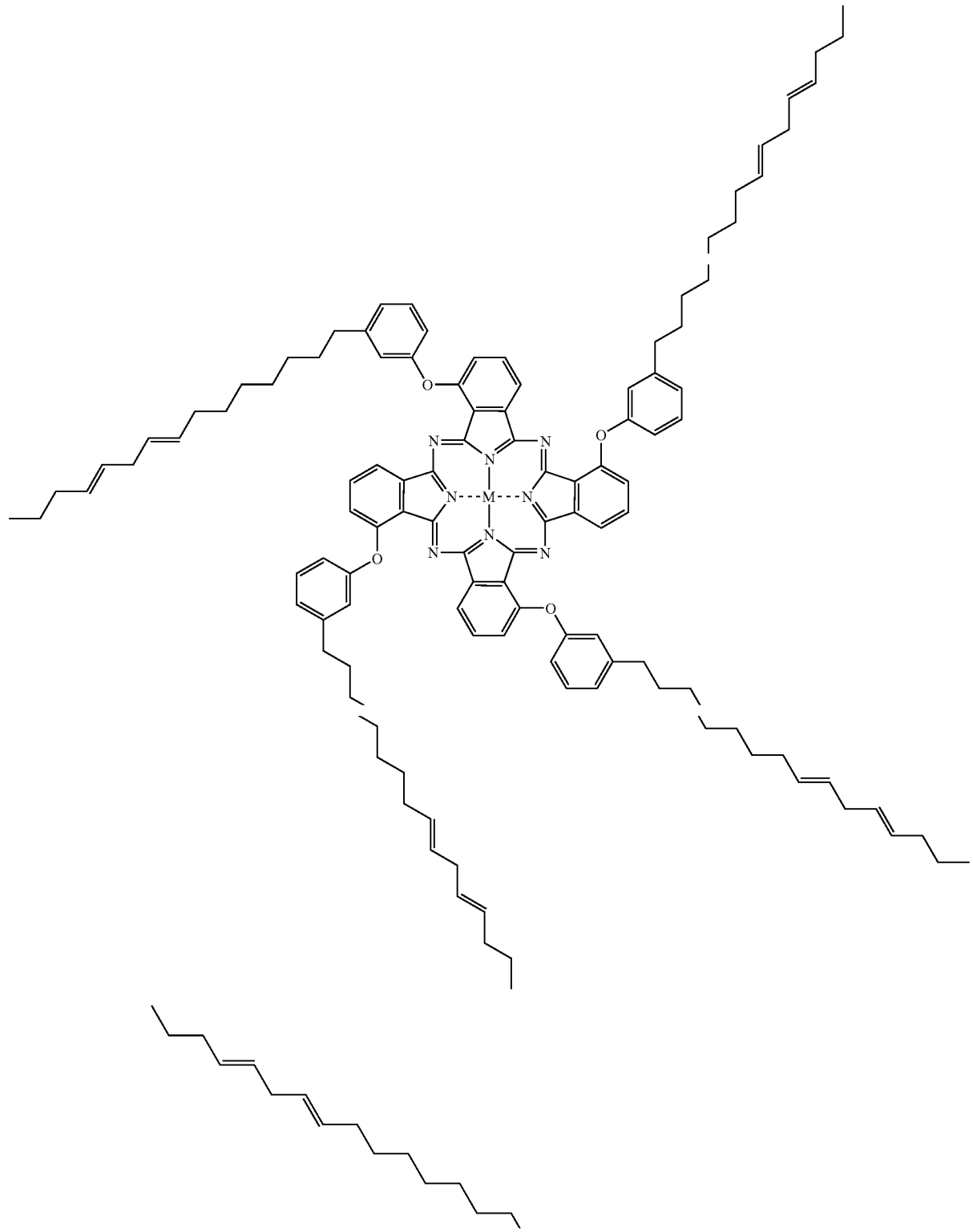

-continued
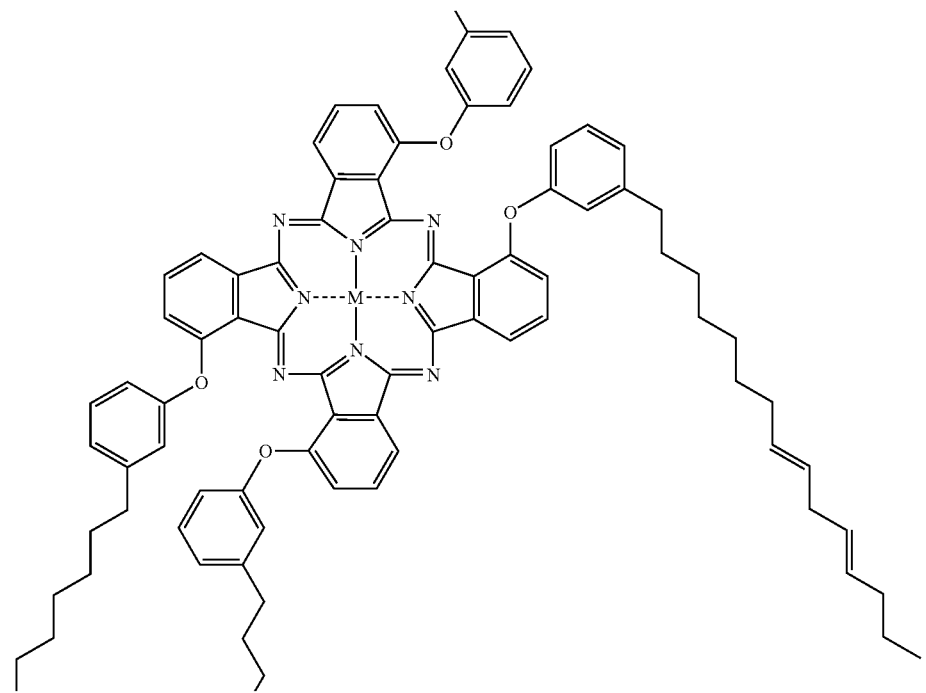
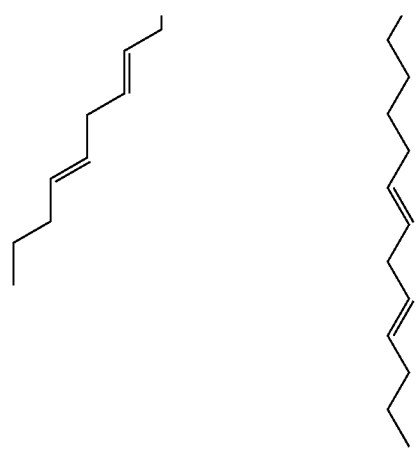

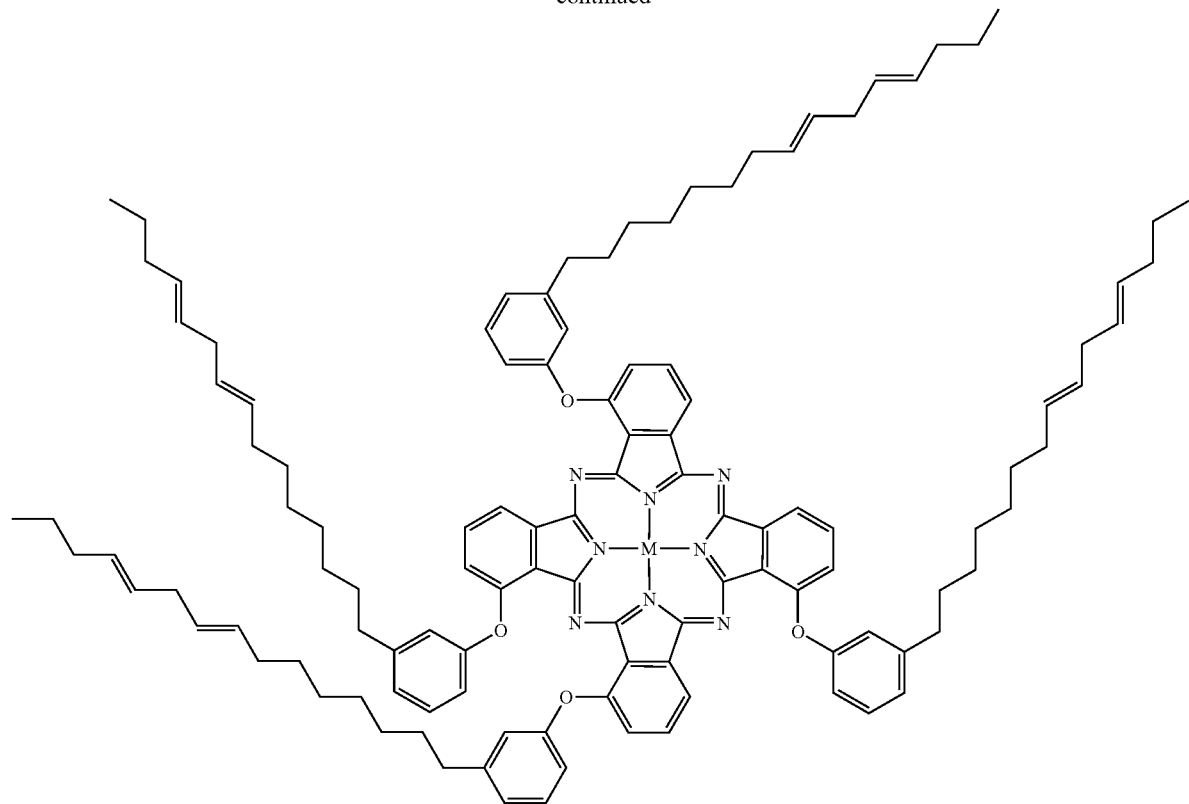
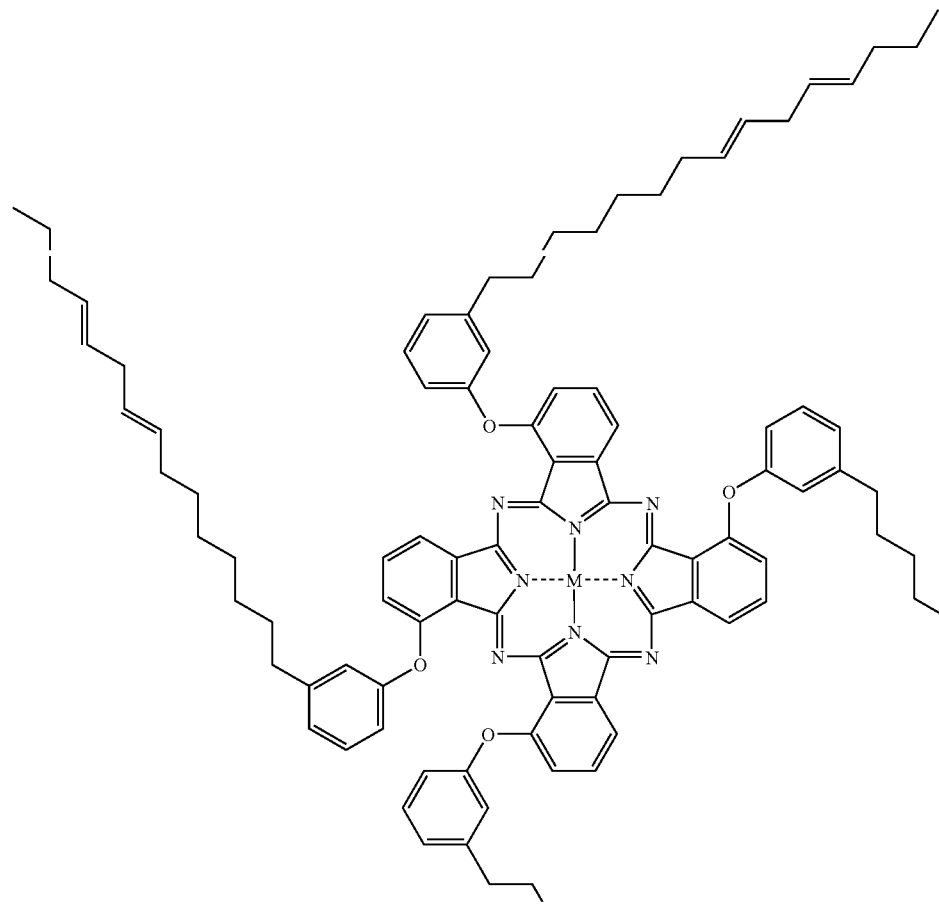

-continued
or mixtures thereof
20. A compound according to claim 1 wherein the compound is of the formula
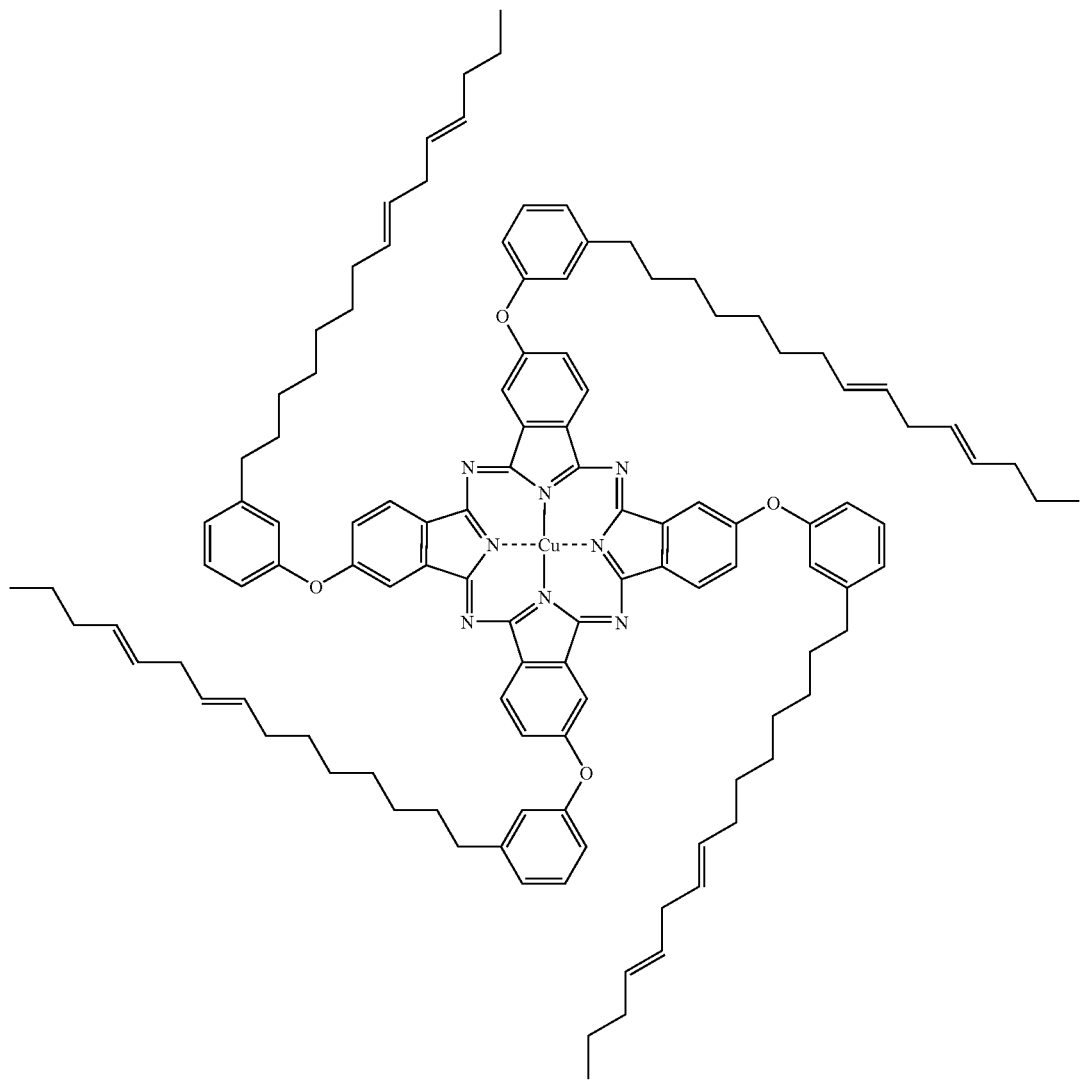

-continued
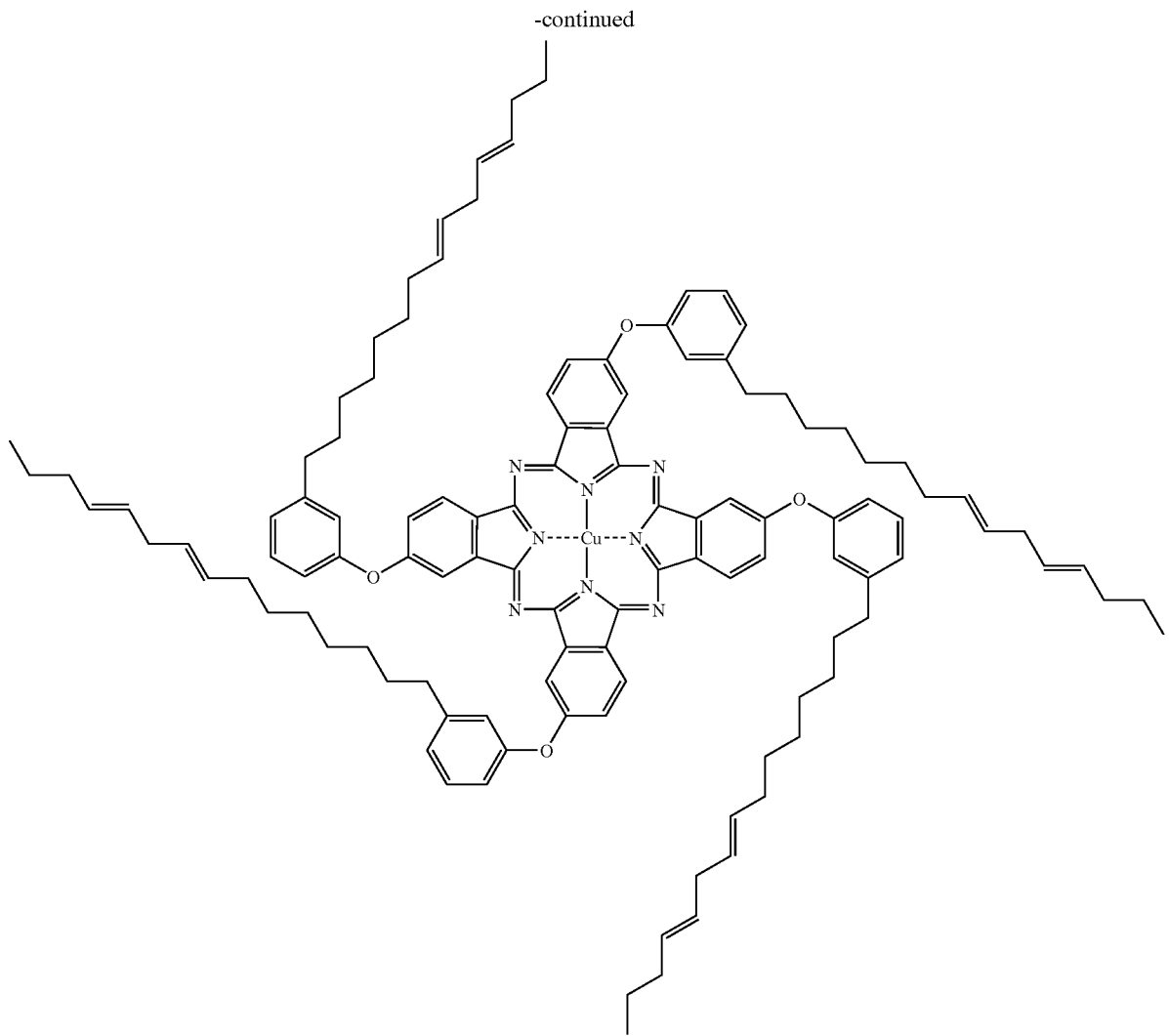
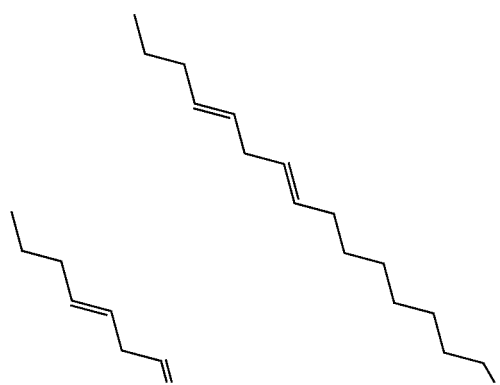

-continued
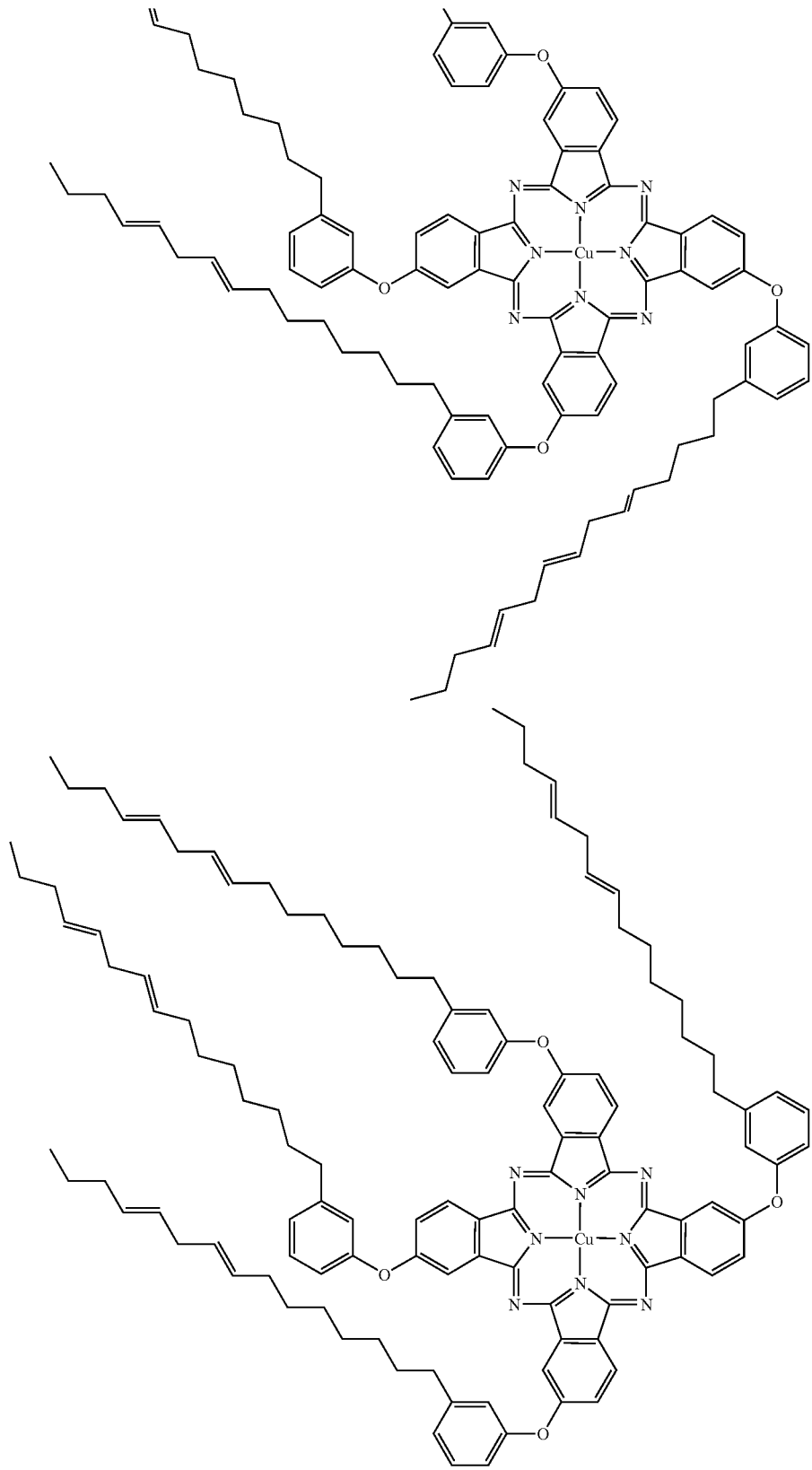
or mixtures thereof.

21. A compound according to claim 1 wherein the compound is of the formula
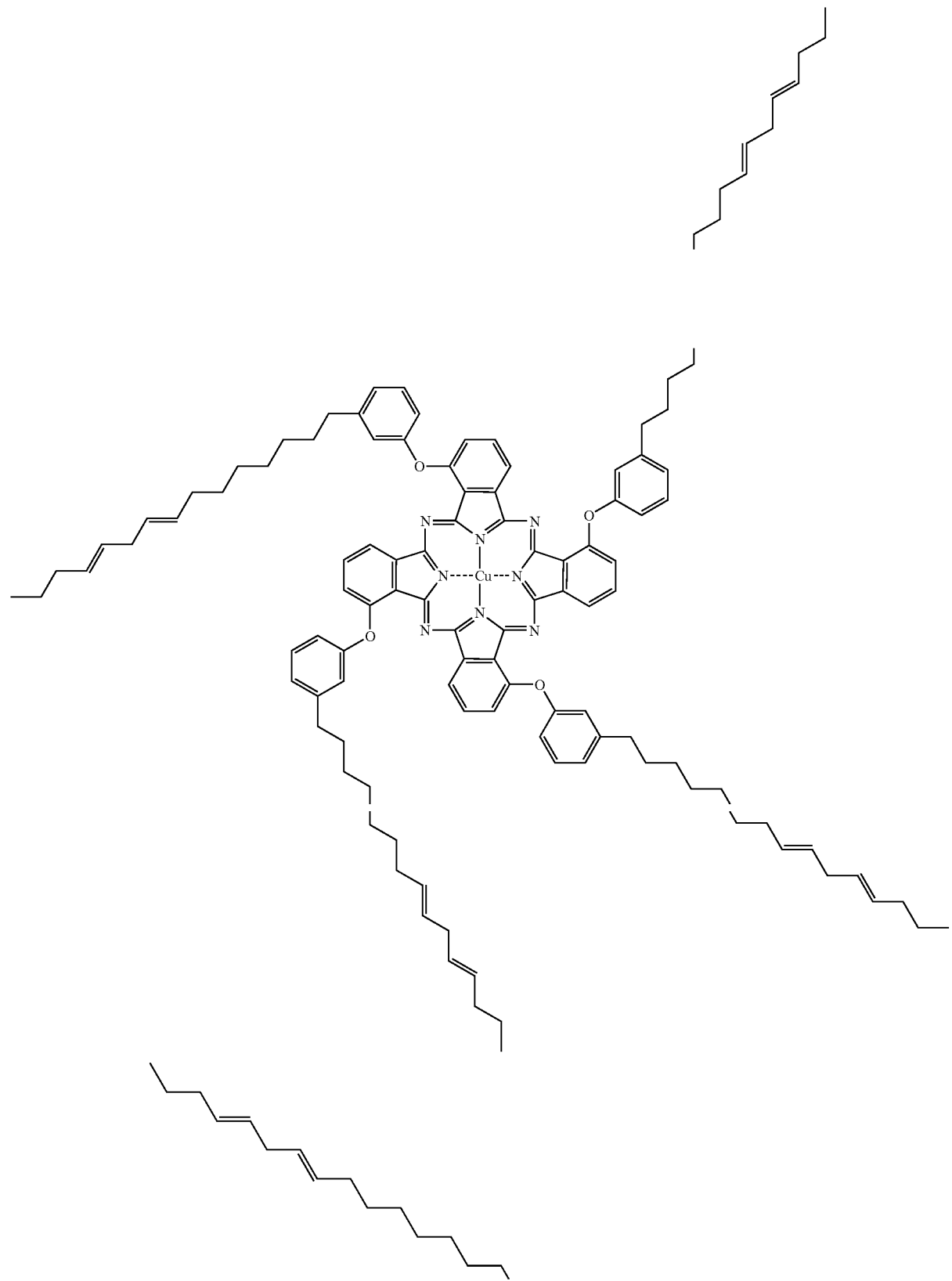

-continued
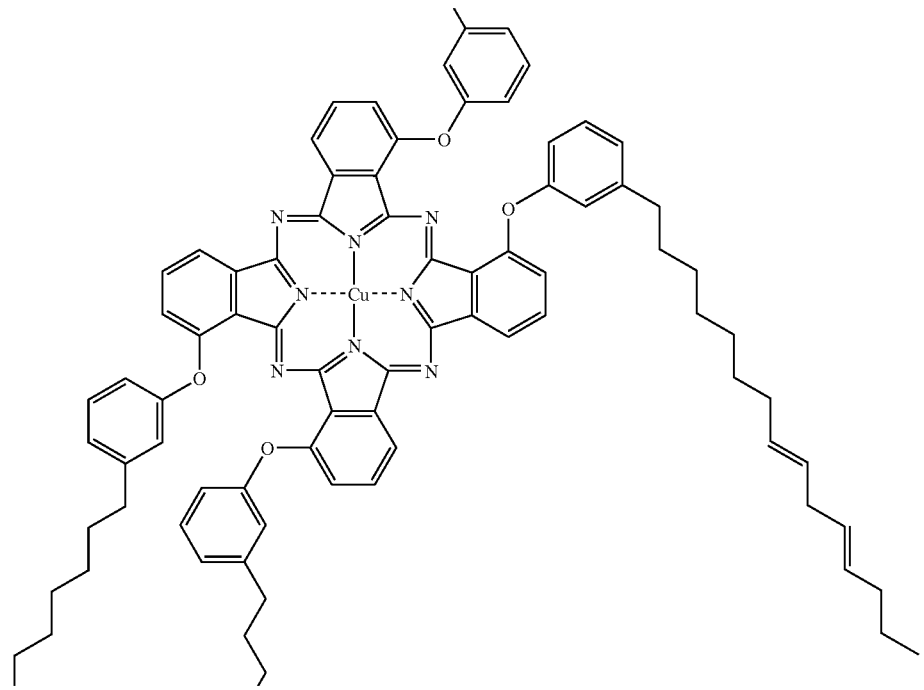
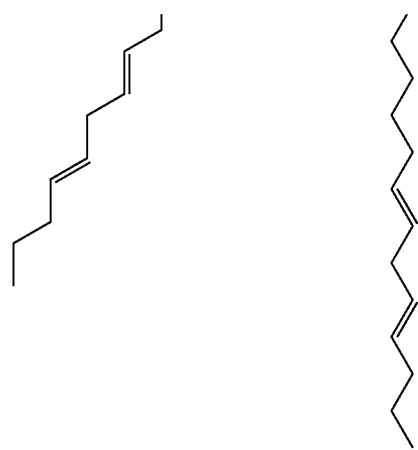

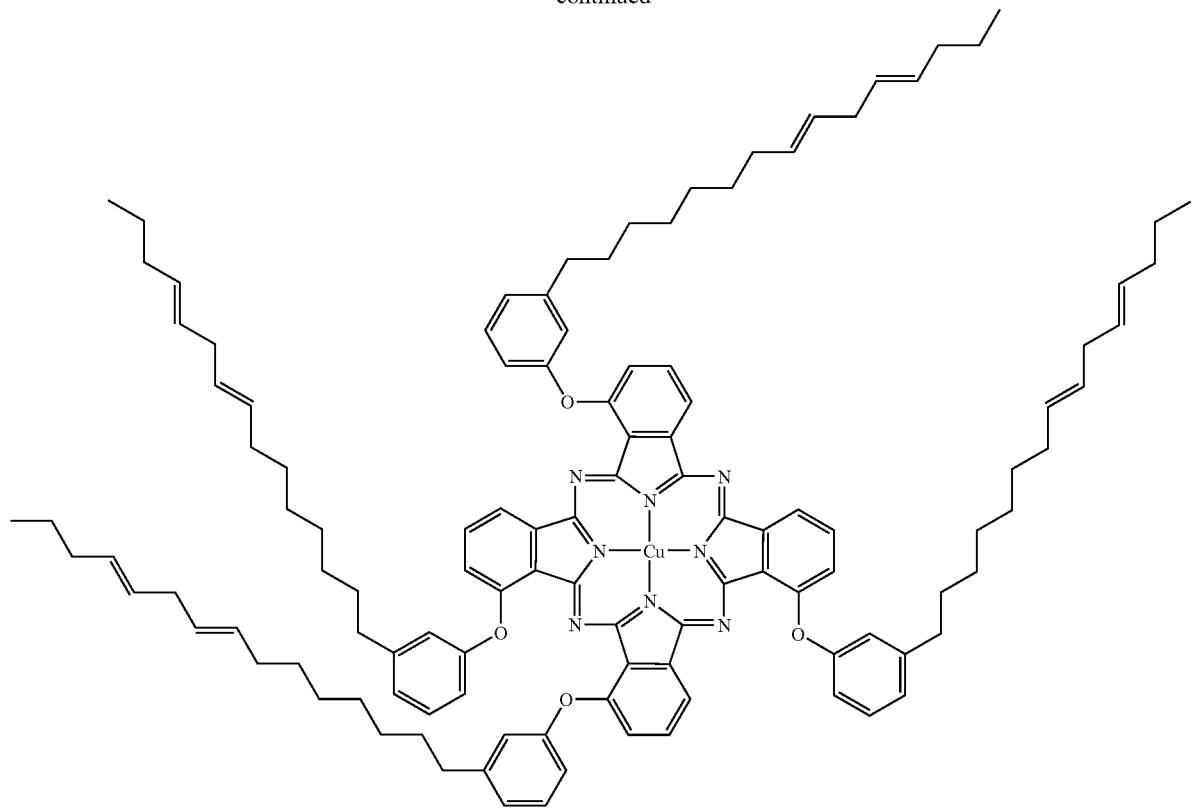
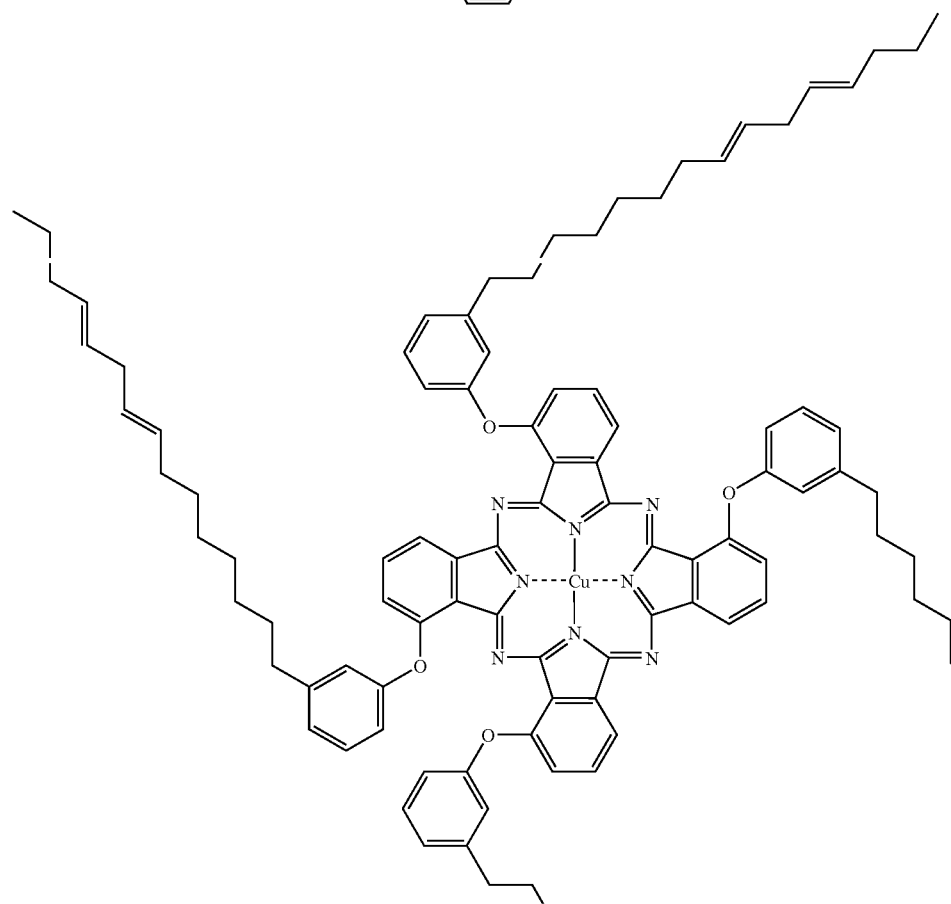

-continued or mixtures thereof.

* * * * *